(12) United States Patent
Gagne et al.

(10) Patent No.: US 12,094,043 B2
(45) Date of Patent: Sep. 17, 2024

(54) COMPUTER ANIMATION METHODS AND SYSTEMS

(71) Applicant: BRINX SOFTWARE INC., Ontario (CA)

(72) Inventors: Jonathan Gagne, Ontario (CA); Po Kong Lai, Ontario (CA)

(73) Assignee: BRINX SOFTWARE INC., Ottawa (CA)

( * ) Notice: Subject to any disclaimer, the term of this patent is extended or adjusted under 35 U.S.C. 154(b) by 249 days.

(21) Appl. No.: 17/425,101

(22) PCT Filed: Jan. 24, 2020

(86) PCT No.: PCT/CA2020/050090
§ 371 (c)(1),
(2) Date: Jul. 22, 2021

(87) PCT Pub. No.: WO2020/150837
PCT Pub. Date: Jul. 30, 2020

(65) Prior Publication Data
US 2022/0108513 A1 Apr. 7, 2022
US 2023/0148441 A9 May 11, 2023

(30) Foreign Application Priority Data
Jan. 25, 2019 (CA) ..................... 3031479

(51) Int. Cl.
*G09G 5/00* (2006.01)
*G06F 3/0346* (2013.01)
(Continued)

(52) U.S. Cl.
CPC ............ *G06T 13/40* (2013.01); *G06F 3/0346* (2013.01); *G06F 3/04815* (2013.01);
(Continued)

(58) Field of Classification Search
CPC ... G06T 13/40; G06T 2200/24; G06F 3/0346; G06F 3/04815; G06F 3/04847; G06F 3/011; H04N 13/332; H04N 13/344
(Continued)

(56) References Cited

U.S. PATENT DOCUMENTS 10,032,305 B2  7/2018 West
10,656,753 B1 *  5/2020 Smith ................ G06F 3/04845
(Continued)

FOREIGN PATENT DOCUMENTS

WO   2017139509 A1   8/2017
WO   2017197394 A1   11/2017

OTHER PUBLICATIONS

International Search Report in PCT/CA2020/050090, mailed May 22, 2020, 3 pages.
(Continued)

*Primary Examiner* — Thuy N Pardo
(74) *Attorney, Agent, or Firm* — Ewing & Jones, PLLC

(57) ABSTRACT

According to at least one embodiment, there is provided a computer animation method comprising: causing at least one visual display to display at least one virtual three-dimensional user interface to at least one user; and receiving at least one user input signal from at least one sensor of three-dimensional movement in response to, at least, movement of the at least one sensor by the at least one user, wherein the at least one user input signal represents interaction by the at least one user with the at least one virtual three-dimensional user interface at least to define at least one animation parameter. Computer-readable media and systems are also disclosed.

64 Claims, 27 Drawing Sheets

(51) Int. Cl.
*G06F 3/04815* (2022.01)
*G06F 3/04847* (2022.01)
*G06T 13/40* (2011.01)
*H04N 13/332* (2018.01)

(52) U.S. Cl.
CPC ....... *G06F 3/04847* (2013.01); *H04N 13/332* (2018.05); *G06T 2200/24* (2013.01)

(58) Field of Classification Search
USPC .................. 345/156, 161, 167, 174, 173
See application file for complete search history.

(56) References Cited

U.S. PATENT DOCUMENTS

| | | | | |
|---|---|---|---|---|
| 10,936,114 | B1* | 3/2021 | Smith | G06F 3/048 |
| 2005/0253846 | A1* | 11/2005 | Russ | G06T 19/20 345/473 |
| 2009/0051544 | A1* | 2/2009 | Niknejad | G06F 3/011 340/573.1 |
| 2014/0184496 | A1 | 7/2014 | Gribetz et al. | |
| 2016/0370882 | A1* | 12/2016 | McGrath | G06F 3/017 |
| 2017/0329503 | A1* | 11/2017 | Tilton | G06F 3/011 |
| 2018/0365883 | A1* | 12/2018 | Fillhardt | G01C 21/3638 |
| 2019/0018567 | A1 | 1/2019 | Murphy et al. | |
| 2019/0034076 | A1 | 1/2019 | Vinayak et al. | |
| 2019/0278379 | A1* | 9/2019 | Gribetz | G06F 3/04842 |
| 2020/0104017 | A1* | 4/2020 | Tran | G06T 13/00 |
| 2022/0335699 | A1* | 10/2022 | Fillhardt | G06F 16/29 |
| 2023/0091359 | A1* | 3/2023 | Nguyen | G06T 13/20 |

OTHER PUBLICATIONS

Written Opinion of the International Searching Authority in PCT/CA2020/050090, mailed May 22, 2020, 4 pages.

Mine et al., "Making VR Work: Building a Real-World Immersive Modeling Application in the Virtual World", Proceedings of the 2nd ACM Symposium on Spatial User Interaction (SUI '14), 2014, 10 pages.

Vive VR System, downloaded from https://web.archive.org/web/20190118200555/https:/www.vive.com/ca/product/ and dated Jan. 18, 2019 by https://web.archive.org, 8 pages.

Compare Headsets, downloaded from https://web.archive.org/web/20191114153955/https://www.oculus.com/compare/ and dated Nov. 14, 2019 by https://web.archive.org, 4 pages.

Valve Index, downloaded from https://web.archive.org/web/20190430204131/https://store.steampowered.com/valveindex and dated Apr. 30, 2019 by https://web.archive.org, 2 pages.

Quill, downloaded from https://web.archive.org/web/20180208235643/https:/quill.fb.com/ and dated Feb. 8, 2018 by https://web.archive.org, 3 pages.

About VR-Plugin, downloaded from https://web.archive.org/web/20160523093247/http:/www.vr-plugin.com/ and dated May 23, 2016 by https://web.archive.org, 13 pages.

Nvrmind, downloaded from https://web.archive.org/web/20161016085507/https://nvrmind.io/#about and dated Oct. 16, 2016 by https://web.archive.org, 5 pages.

Ollie, downloaded from https://web.archive.org/web/20191205074416/https:/ollievr.com/ and dated Dec. 5, 2019 by https://web.archive.org, 1 page.

Cascadeur, downloaded from https://web.archive.org/web/20170713192849/https://cascadeur.com and dated Jul. 13, 2017 by https://web.archive.org, 3 oages.

Mixamo, downloaded from https://web.archive.org/web/20090803123010/https:/www.mixamo.com/ and dated Aug. 3, 2009 by https://web.archive.org, 2 pages.

Extended European Search Report in Application No. 20745476.0, mailed Oct. 5, 2022, 7 pages.

* cited by examiner

COMPUTER ANIMATION METHODS AND SYSTEMS

CROSS-REFERENCE TO RELATED APPLICATIONS

This application claims the benefit of PCT/CA2020/050090 filed Jan. 24, 2020, which Claims priority from CA 3,031,479 filed Jan. 25, 2019, which are incorporated herein by reference in their entireties for all purposes.

FIELD

This disclosure relates generally to computer animation.

RELATED ART

Computers may be used to animate images, but some methods of computer animation are time-consuming or cumbersome.

SUMMARY

According to at least one embodiment, there is provided a computer animation method comprising: causing at least one visual display to display at least one virtual three-dimensional user interface to at least one user; and receiving at least one user input signal from at least one sensor of three-dimensional movement in response to, at least, movement of the at least one sensor by the at least one user, wherein the at least one user input signal represents interaction by the at least one user with the at least one virtual three-dimensional user interface at least to define at least one animation parameter.

In some embodiments, the at least one visual display comprises at least one stereoscopic visual display.

In some embodiments, a headset comprises the at least one stereoscopic visual display.

In some embodiments, the at least one animation parameter comprises at least one animation parameter defining at least one rig element.

In some embodiments, each rig element of the at least one rig element comprises a respective at least one control point and a respective rigid shape.

In some embodiments, for each rig element of the at least one rig element, the respective rigid shape is movable relative to one of the respective at least one control point.

In some embodiments, the at least one animation parameter defining the at least one rig element comprises at least one animation parameter defining the respective rigid shape of the at least one rig element.

In some embodiments, the at least one animation parameter defining the at least one rig element comprises at least one animation parameter defining a dimension of the respective rigid shape of the at least one rig element.

In some embodiments, the at least one animation parameter defining the at least one rig element comprises at least one animation parameter defining a location, relative to at least one other rig element, of one of the respective at least one control point of the at least one rig element.

In some embodiments, the at least one animation parameter defining the at least one rig element comprises at least one animation parameter defining a location, relative to at least one three-dimensional shape, of one of the respective at least one control point of the at least one rig element.

In some embodiments, the method further comprises defining the location of the respective at least one control point of the at least one rig element automatically in response to, at least, a location, relative to the at least one three-dimensional shape, of at least one virtual per-vertex animation tool movable in the at least one virtual three-dimensional user interface in response to, at least, movement of the at least one sensor by the at least one user.

In some embodiments, the method further comprises defining a dimension of the at least one rig element automatically in response to, at least, an intersection of the at least one virtual per-vertex animation tool and the at least one three-dimensional shape.

In some embodiments, the at least one animation parameter comprises at least one animation parameter defining at least one association of at least one surface element of the at least one three-dimensional shape with one or more of the at least one rig element.

In some embodiments, the at least one animation parameter comprises at least one animation parameter defining movement of at least one surface element of the at least one three-dimensional shape relative to at least one other surface element of the at least one three-dimensional shape.

In some embodiments, the at least one animation parameter comprises at least one animation parameter defining movement of at least one surface element of at least one three-dimensional shape relative to at least one other surface element of the at least one three-dimensional shape.

In some embodiments, the at least one animation parameter comprises at least one animation parameter defining at least one association of at least one surface element of at least one three-dimensional shape with at least one rig element.

In some embodiments, each rig element of the at least one rig element comprises a respective at least one control point and a respective rigid shape.

In some embodiments, for each rig element of the at least one rig element, the respective rigid shape is movable relative to one of the respective at least one control point.

In some embodiments, the at least one association of the at least one surface element of the at least one three-dimensional shape with the at least one rig element comprises a respective weight associated with each rig element of the at least one rig element and defining a respective degree of influence of movement of the at least one rig element to movement of the at least one surface element of the at least one three-dimensional shape.

In some embodiments, the at least one virtual three-dimensional user interface comprises an illustration of at least a portion of the at least one three-dimensional shape.

In some embodiments, the at least one user input defining the at least one association of the at least one surface element of the at least one three-dimensional shape with the at least one rig element comprises application, to the illustration, of at least one virtual skinning tool movable in the at least one virtual three-dimensional user interface in response to, at least, movement of the at least one sensor by the at least one user.

In some embodiments, the application of the at least one virtual skinning tool to the illustration comprises: defining the at least one association of a first surface element of the at least one three-dimensional shape with the at least one rig element; and defining the at least one association of a second surface element of the at least one three-dimensional shape with the at least one rig element.

In some embodiments, the at least one association of the first surface element differs from the at least one association of the second surface element.

In some embodiments, the first surface element and the second surface element are at different distances from a reference point of the at least one virtual skinning tool.

In some embodiments, the at least one virtual three-dimensional user interface comprises an illustration of the at least one association of the at least one surface element of the at least one three-dimensional shape with the at least one rig element.

In some embodiments, the method further comprises producing at least one output signal representing animation of the at least one three-dimensional shape according to the at least one animation parameter.

In some embodiments, the method further comprises defining a respective position of the at least one rig element for at least one keyframe of animation.

In some embodiments, the at least one virtual three-dimensional user interface comprises an illustration of the at least one rig element.

In some embodiments, the at least one rig element is at least one rig element of a rig comprising a plurality of rig elements.

In some embodiments, the at least one animation parameter comprises at least one parameter of articulated movement.

According to at least one embodiment, there is provided at least one computer-readable medium comprising program codes stored thereon that, when executed by at least one processor, cause the at least one processor to implement the method.

According to at least one embodiment, there is provided a computer animation system comprising: the at least one computer-readable medium; and the at least one processor.

In some embodiments, the system further comprises the at least one visual display.

In some embodiments, the system further comprises the at least one sensor.

According to at least one embodiment, there is provided a computer animation system comprising at least one processor programmed to, at least: cause at least one visual display to display at least one virtual three-dimensional user interface to at least one user; receive at least one user input signal from at least one sensor of three-dimensional movement in response to, at least, movement of the at least one sensor by the at least one user, wherein the at least one user input signal represents interaction by the at least one user with the at least one virtual three-dimensional user interface; and define at least one animation parameter in response to, at least, the interaction by the at least one user with the at least one virtual three-dimensional user interface.

In some embodiments, the at least one animation parameter comprises at least one animation parameter defining at least one rig element.

In some embodiments, each rig element of the at least one rig element comprises a respective at least one control point and a respective rigid shape.

In some embodiments, for each rig element of the at least one rig element, the respective rigid shape is movable relative to one of the respective at least one control point.

In some embodiments, the at least one animation parameter defining the at least one rig element comprises at least one animation parameter defining the respective rigid shape of the at least one rig element.

In some embodiments, the at least one animation parameter defining the at least one rig element comprises at least one animation parameter defining a dimension of the respective rigid shape of the at least one rig element.

In some embodiments, the at least one animation parameter defining the at least one rig element comprises at least one animation parameter defining a location, relative to at least one other rig element, of one of the respective at least one control point of the at least one rig element.

In some embodiments, the at least one animation parameter defining the at least one rig element comprises at least one animation parameter defining a location, relative to at least one three-dimensional shape, of one of the respective at least one control point of the at least one rig element.

In some embodiments, the at least one processor is further programmed to, at least, define the location of the respective at least one control point of the at least one rig element automatically in response to, at least, a position, relative to the at least one three-dimensional shape, of at least one virtual per-vertex animation tool movable in the at least one virtual three-dimensional user interface in response to, at least, movement of the at least one sensor by the at least one user.

In some embodiments, the at least one processor is further programmed to, at least, define a dimension of the at least one rig element automatically in response to, at least, an intersection of the at least one virtual per-vertex animation tool and the at least one three-dimensional shape.

In some embodiments, the at least one animation parameter comprises at least one animation parameter defining at least one association of at least one surface element of the at least one three-dimensional shape with one or more of the at least one rig element.

In some embodiments, the at least one animation parameter comprises at least one animation parameter defining movement of at least one surface element of the at least one three-dimensional shape relative to at least one other surface element of the at least one three-dimensional shape.

In some embodiments, the at least one animation parameter comprises at least one animation parameter defining movement of at least one surface element of at least one three-dimensional shape relative to at least one other surface element of the at least one three-dimensional shape.

In some embodiments, the at least one animation parameter comprises at least one animation parameter defining at least one association of at least one surface element of at least one three-dimensional shape with at least one rig element.

In some embodiments, each rig element of the at least one rig element comprises a respective at least one control point and a respective rigid shape.

In some embodiments, for each rig element of the at least one rig element, the respective rigid shape is movable relative to one of the respective at least one control point.

In some embodiments, the at least one association of the at least one surface element of the at least one three-dimensional shape with the at least one rig element comprises a respective weight associated with each rig element of the at least one rig element and defining a respective degree of influence of movement of the at least one rig element to movement of the at least one surface element of the at least one three-dimensional shape.

In some embodiments, the at least one virtual three-dimensional user interface comprises an illustration of at least a portion of the at least one three-dimensional shape.

In some embodiments, the at least one user input defining the at least one association of the at least one surface element of the at least one three-dimensional shape with the at least one rig element comprises application, to the illustration, of at least one virtual skinning tool movable in the at least one virtual three-dimensional user interface in response to, at least, movement of the at least one sensor by the at least one user.

In some embodiments, the at least one processor is further programmed to, at least, in response to, at least, the application of the at least one virtual skinning tool to the illustration: define the at least one association of a first surface element of the at least one three-dimensional shape with the at least one rig element; and define the at least one association of a second surface element of the at least one three-dimensional shape with the at least one rig element.

In some embodiments, the at least one association of the first surface element differs from the at least one association of the second surface element.

In some embodiments, the first surface element and the second surface element are at different distances from a reference point of the at least one virtual skinning tool.

In some embodiments, the at least one virtual three-dimensional user interface comprises an illustration of the at least one association of the at least one surface element of the at least one three-dimensional shape with the at least one rig element.

In some embodiments, the at least one processor is further programmed to, at least, produce at least one output signal representing animation of the at least one three-dimensional shape according to the at least one animation parameter.

In some embodiments, the at least one processor is further programmed to, at least, in response to, at least, the interaction by the at least one user with the at least one virtual three-dimensional user interface, define a respective position of the at least one rig element for at least one keyframe of animation.

In some embodiments, the at least one virtual three-dimensional user interface comprises an illustration of the at least one rig element.

In some embodiments, the at least one rig element is at least one rig element of a rig comprising a plurality of rig elements.

In some embodiments, the at least one animation parameter comprises at least one parameter of articulated movement.

In some embodiments, the system further comprises the at least one visual display.

In some embodiments, the at least one visual display comprises at least one stereoscopic visual display.

In some embodiments, a headset comprises the at least one stereoscopic visual display.

In some embodiments, the system further comprises the at least one sensor.

Other aspects and features will become apparent to those ordinarily skilled in the art upon review of the following description of illustrative embodiments in conjunction with the accompanying figures.

DETAILED DESCRIPTION

Figure 1:
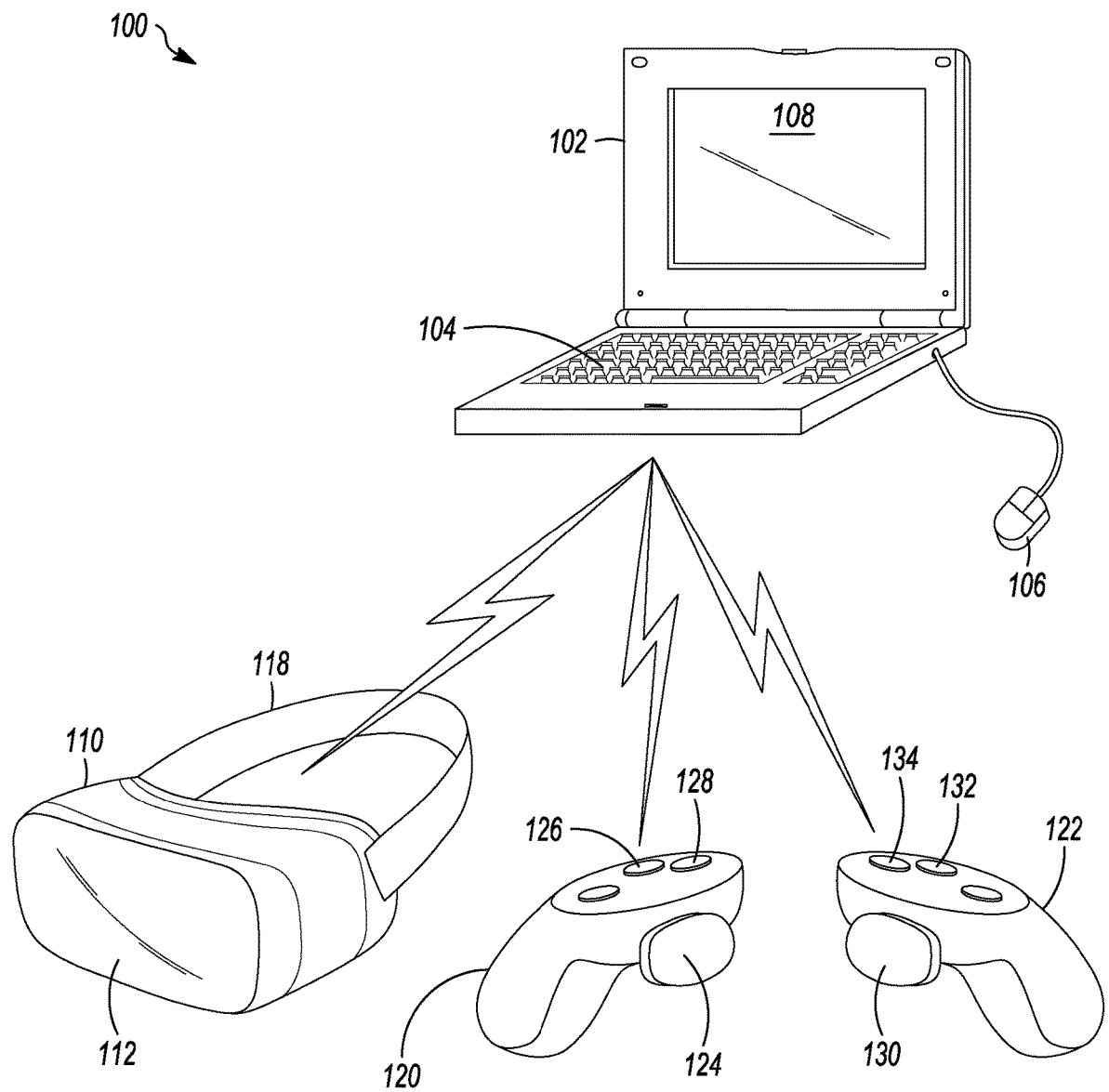
FIG. 1 is a perspective view of a computer animation system according to one embodiment.

Referring to FIG. 1, a computer animation system according to one embodiment is shown generally at 100 and includes a computer 102. The computer 102 in the embodiment shown is a laptop computer including a keyboard 104, a mouse 106, and a display screen 108. The computer 102 is an example only, and computers of alternative embodiments may differ. For example, computers of alternative embodiments may include one or more personal computers, one or more tablet computers, one or more server computers, or one or more different computing devices, and computers of alternative embodiments may include one or more different input devices and may include one or more different output devices.

Figure 2:
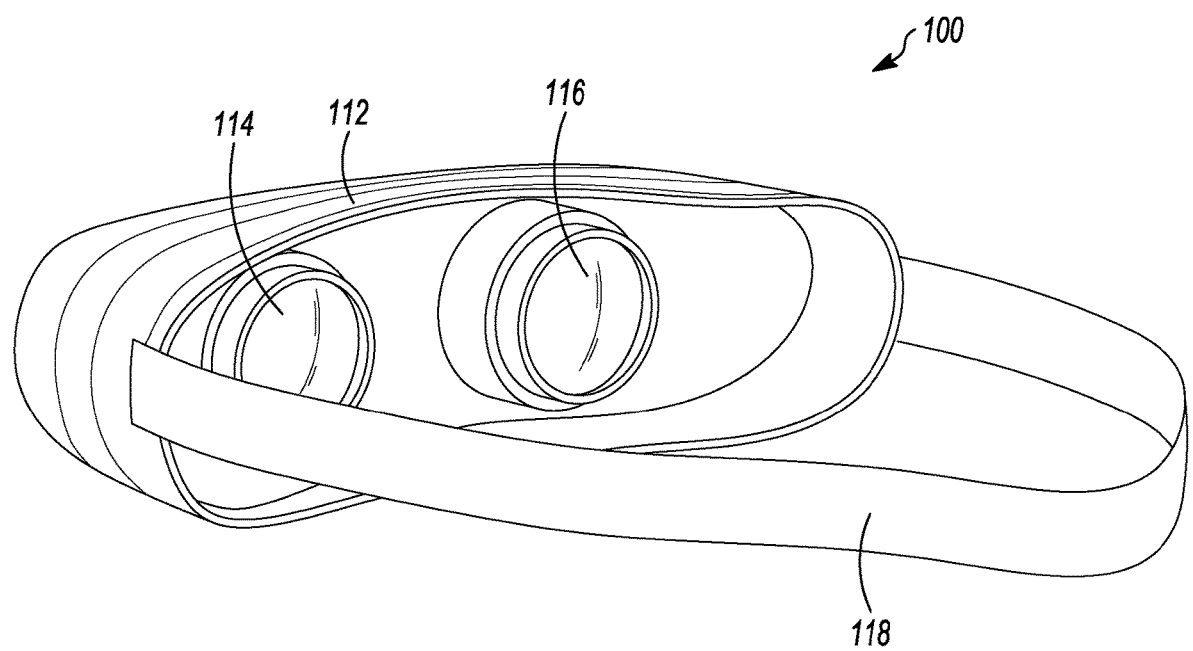
FIG. 2 is a perspective view of a headset of the system of FIG. 1.

Referring to FIG. 1 and to FIG. 2, the system 100 also includes a headset 110 that may be in communication with the computer 102. In the embodiment shown, the headset 110 includes a stereoscopic display 112 including a left-eye display 114 and a right-eye display 116. The headset 110 also includes a head strap 118 operable to hold the left-eye display 114 close to and in a field of view of a left eye of a user, and to hold the right-eye display 116 close to and in a field of view of a right eye of the user. Further, the headset 110 may be operable to receive one or more signals from the computer 102, and the left-eye display 114 and the right-eye display 116 are operable to produce a simulated three-dimensional environment to the user in response to the one or more signals received from the computer 102 when the user wears the headset 110 with the left-eye display 114 close to and in the field of view of the left eye of a user and with the right-eye display 116 close to and in the field of view of the right eye of the user. Such a simulated three-dimensional environment may be perceived by the user in a field of view of about 110 degrees. Therefore, the headset 110 may function as a virtual-reality ("VR") headset when worn on a head of the user.

However, the headset 110 is an example only, and alternative embodiments may include one or more different visual displays, such as one or more different stereoscopic displays or one or more different displays that may be operable to display simulated three-dimensional environments, for example. For example, visual displays of alternative embodiments may include one or more augmentedreality ("AR") displays, one or more mixed-reality ("MR") displays, one or more extended-reality ("XR") displays, or one or more other displays. Also, visual displays of alternative embodiments may include one or more projectors, such as one or more three-dimensional projectors or one or more projectors for a cave automatic virtual environment ("CAVE") for example.

Referring back to FIG. 1, the system 100 also includes a movement sensor 120 and a movement sensor 122, which may also be in communication with the computer 102. In the embodiment shown, the user may hold the movement sensor 120 in a left hand of the user, and the user may hold the movement sensor 122 in a right hand of the user, for example.

In the embodiment shown, the movement sensor 120 is operable to sense three-dimensional movement of the movement sensor 120, to produce one or more signals representing the three-dimensional movement of the movement sensor 120, and to transmit the one or more signals representing the three-dimensional movement of the movement sensor 120 to the computer 102, for example. Likewise, in the embodiment shown, the movement sensor 122 is operable to sense three-dimensional movement of the movement sensor 122, to produce one or more signals representing the three-dimensional movement of the movement sensor 122, and to transmit the one or more signals representing the three-dimensional movement of the movement sensor 122 to the computer 102, for example. Herein, three-dimensional movement may include linear movement relative to three different axes, rotational movement relative to three different axes, or both, for example.

Further, in the embodiment shown, the movement sensor 120 includes user inputs (which may be user-actuatable buttons or other actuation sensors, for example) 124, 126, and 128, and the movement sensor 120 is operable to sense user actuation of one or more of the user inputs 124, 126, and 128, to produce one or more signals representing the user actuation of the one or more of the user inputs 124, 126, and 128, and to transmit the one or more signals representing the user actuation of the one or more of the user inputs 124, 126, and 128 to the computer 102, for example. Likewise, in the embodiment shown, the movement sensor 122 includes user inputs (which may be user-actuatable buttons, for example) 130, 132, and 134, and the movement sensor 122 is operable to sense user actuation of one or more of the user inputs 130, 132, and 134, to produce one or more signals representing the user actuation of the one or more of the user inputs 130, 132, and 134, and to transmit the one or more signals representing the user actuation of the one or more of the user inputs 130, 132, and 134 to the computer 102, for example.

The movement sensors 120 and 122 are examples only, and alternative embodiments may include one or more different sensors of three-dimensional movement. Further, the user inputs 124, 126, 128, 130, 132, and 134 are examples only, and alternative embodiments may include more or fewer user inputs or one or more different user inputs. Further, user-actuatable buttons or other actuation sensors may be omitted in some embodiments. For example, some embodiments may identify user input by sensing movement of one or both of the hands of the user, by sensing movement of one or more other body parts of the user, or in other ways. For example, in alternative embodiments, sensors of three-dimensional movement may include other motion trackers (using one or more accelerometers, one or more gyroscopes, ultrasound, electromagnetic radiation, one or more magnets, or a combination thereof, for example) or markerless tracking.

In the embodiment shown, the headset 110, the first movement sensor 120, and the second movement sensor 122 are configured for wireless communication with the computer 102, but alternative embodiments may differ. For example, in alternative embodiments, one, more than one, or all of the headset 110, the first movement sensor 120, and the second movement sensor 122 may be configured to communicate with the computer 102 by transmitting one or more signals to and receiving one or more signals from the computer 102 using one or more wires, for example.

Figure 3:
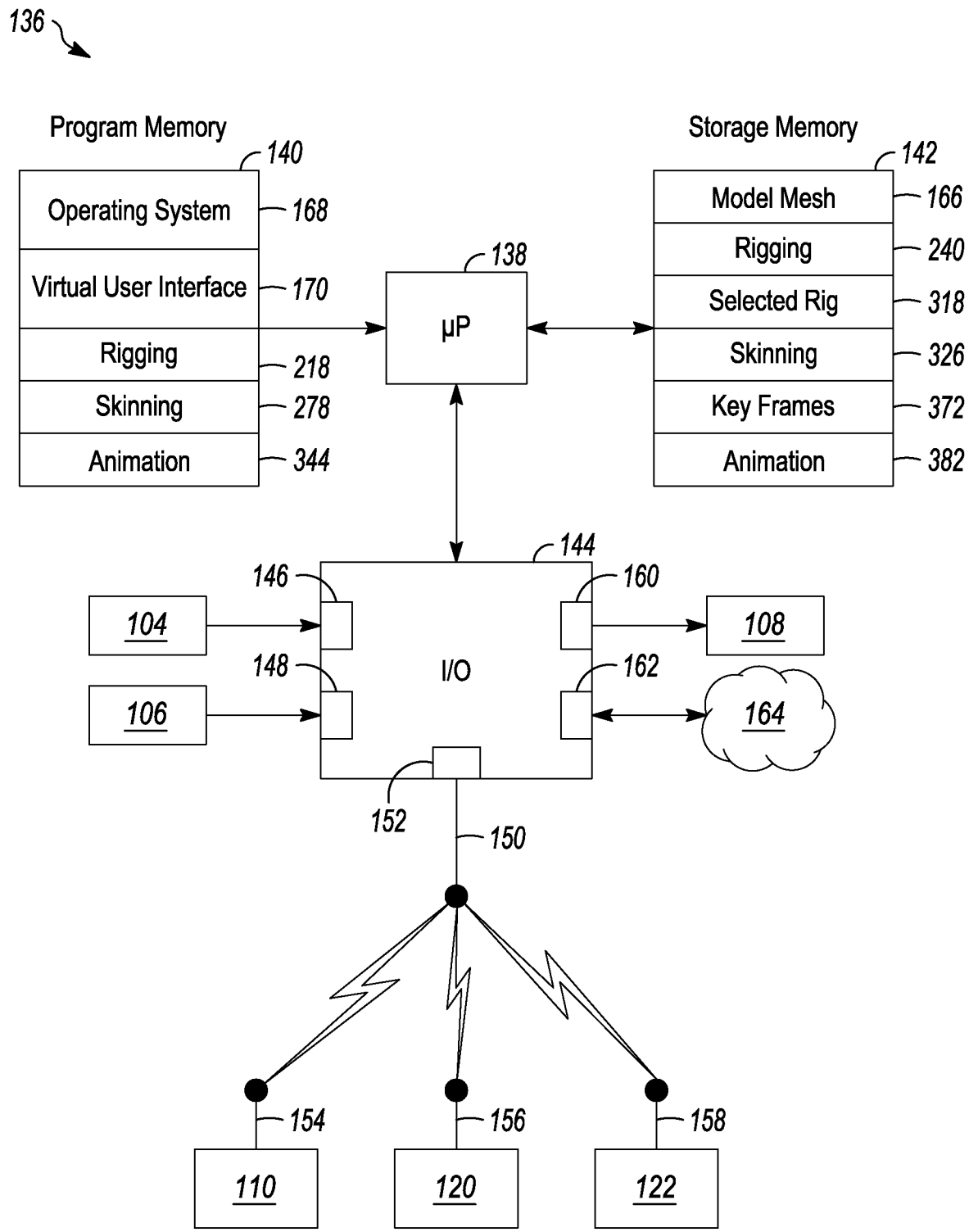
FIG. 3 schematically illustrates a processor circuit of a computer of the system of
FIG. 1.

Referring to FIG. 3, the computer 102 includes a processor circuit shown generally at 136. The processor circuit 136 includes a central processing unit ("CPU") or microprocessor 138. The processor circuit 136 also includes a program memory 140, a storage memory 142, and an input/output ("I/O") module 144 all in communication with the microprocessor 138. In general, the program memory 140 stores program codes that, when executed by the microprocessor 138, cause the processor circuit 136 to implement functions of the computer 102 such as those described herein, for example. Further, in general, the storage memory 142 includes stores for storing storage codes as described herein, for example. The program memory 140 and the storage memory 142 may be implemented in one or more of the same or different computer-readable storage media, which in various embodiments may include one or more of a read-only memory ("ROM"), random access memory ("RAM"), a hard disc drive ("HDD"), a solid-state drive ("SSD"), and other computer-readable and/or computer-writable storage media.

The I/O module 144 may include various signal interfaces, analog-to-digital converters ("ADCs"), receivers, transmitters, and/or other circuitry to receive, produce, and transmit signals as described herein, for example. In the embodiment shown, the I/O module 144 includes a keyboard input signal interface 146 for receiving input signals from the keyboard 104, and a mouse input signal interface 148 for receiving input signals from the mouse 106.

The I/O module 144 also includes a radio-signal transceiver 150 and a radio signal interface 152 for causing the radio-signal transceiver 150 to transmit output signals, and for receiving input signals from the radio-signal transceiver 150, as described herein for example. For example, the radio signal interface 152 may cause the radio-signal transceiver 150 to transmit signals to, receive signals from, or transmit signals to and receive signals from one, more than one, or all of a radio-signal transceiver 154 of the headset 110, a radio-signal transceiver 156 of the movement sensor 120, and a radio-signal transceiver 158 of the movement sensor 122. In some embodiments, the radio signal interface 152 may cause the radio-signal transceiver 150 to transmit, receive, or transmit and receive signals using a Bluetooth™ protocol or a different protocol, for example.

The I/O module 144 also includes a display screen output signal interface 160 for producing and transmitting signals for causing the display screen 108 to produce visible outputs. The I/O module 144 also includes a network interface 162 to transmit signals to, receive signals from, or transmit signals to and receive signals from a computer network 164 such as the Internet, for example.

The I/O module 144 is an example only and may differ in alternative embodiments. For example, alternative embodiments may include more, fewer, or different interfaces. More generally, the processor circuit 136 is an example only, and alternative embodiments may differ. For example, in alternative embodiments, the computer 102 may include different hardware, different software, or both. Such different hardware may include more than one microprocessor, one or more central processing units ("CPUs"), one or more graphics processing units ("GPUs"), one or more machine learning chips, one or more cloud server computers, one or more other alternatives to the microprocessor 138, discrete logic circuits, or an application-specific integrated circuit ("ASIC"), or combinations of one or more thereof, for example.

Still referring to FIG. 3, the storage memory 142 includes a model mesh store 166 for storing storage codes representing one or more polygon meshes of one or more three-dimensional shapes. Such a three-dimensional shape may be an illustration of a person, of an animal, of an inanimate object, or of any other object or objects. In general, the storage codes in the model mesh store 166 may identify vertices, and edges between such vertices, to define the one or more polygon meshes or to define one or more polyhedral shapes. The storage codes in the model mesh store 166 may additionally or alternatively define faces between such edges and such vertices. The storage codes in the model mesh store 166 may additionally or alternatively identify colours or other visible characteristics of such faces to define an appearance of the one or more three-dimensional shapes. However, alternative embodiments may differ and may include storage codes defining one or more three-dimensional shapes in other ways. In some embodiments, the storage codes in the model mesh store 166 may be received from one or more other computers (for example from the computer network 164 using the network interface 162) or may be generated using program codes in the program memory 140, for example.

The program memory 140 may include operating system program codes 168 of an operating system such as Microsoft Windows™, for example. The program memory 140 may also include virtual user interface program codes 170 that, when executed by the microprocessor 138, cause the stereoscopic display 112 to display a virtual user interface to the user when the user wears the headset 110.

Figure 4:
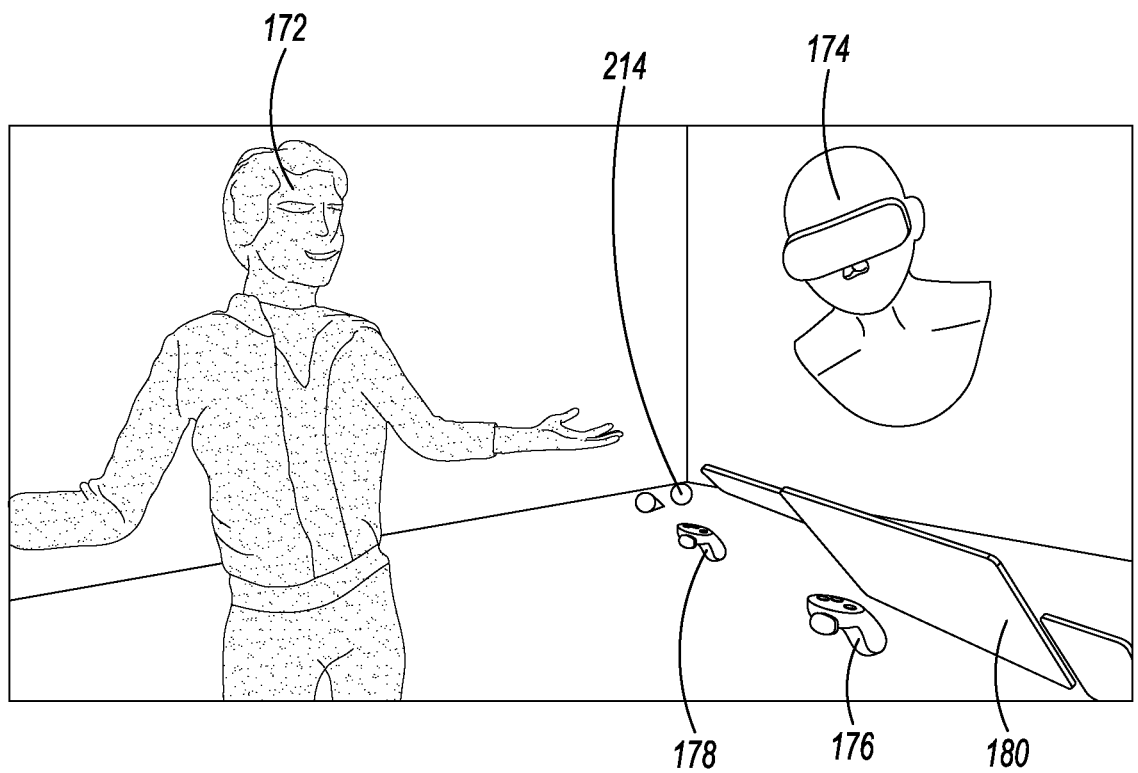
FIG. 4 illustrates an example of a virtual user interface displayed by a stereoscopic display of the headset of FIG. 2.

Referring to FIG. 4, an example of such a virtual user interface is illustrated and includes an illustration 172 of a three-dimensional shape, an illustration 174 of the user, an illustration 176 of the movement sensor 120, an illustration 178 of the movement sensor 122, and an illustration of a virtual user-interface menu 180.

As shown in FIG. 4, the virtual user-interface menu 180 may appear to the user in the virtual user interface at a position and at an orientation relative to a position and to an orientation of the movement sensor 120. Therefore, in the embodiment shown, if the user holds the movement sensor 120 in the left hand of the user, then movement of the left hand of the user may cause corresponding movement of the movement sensor 120, and in response to one or more signals from the movement sensor 120 indicating the position and the orientation of the movement sensor 120, the virtual user interface program codes 170 may cause the stereoscopic display 112 to display to the user the virtual user-interface menu 180 in the virtual user interface at a position and at an orientation corresponding to the position and to the orientation of the movement sensor 120.

Figure 5:
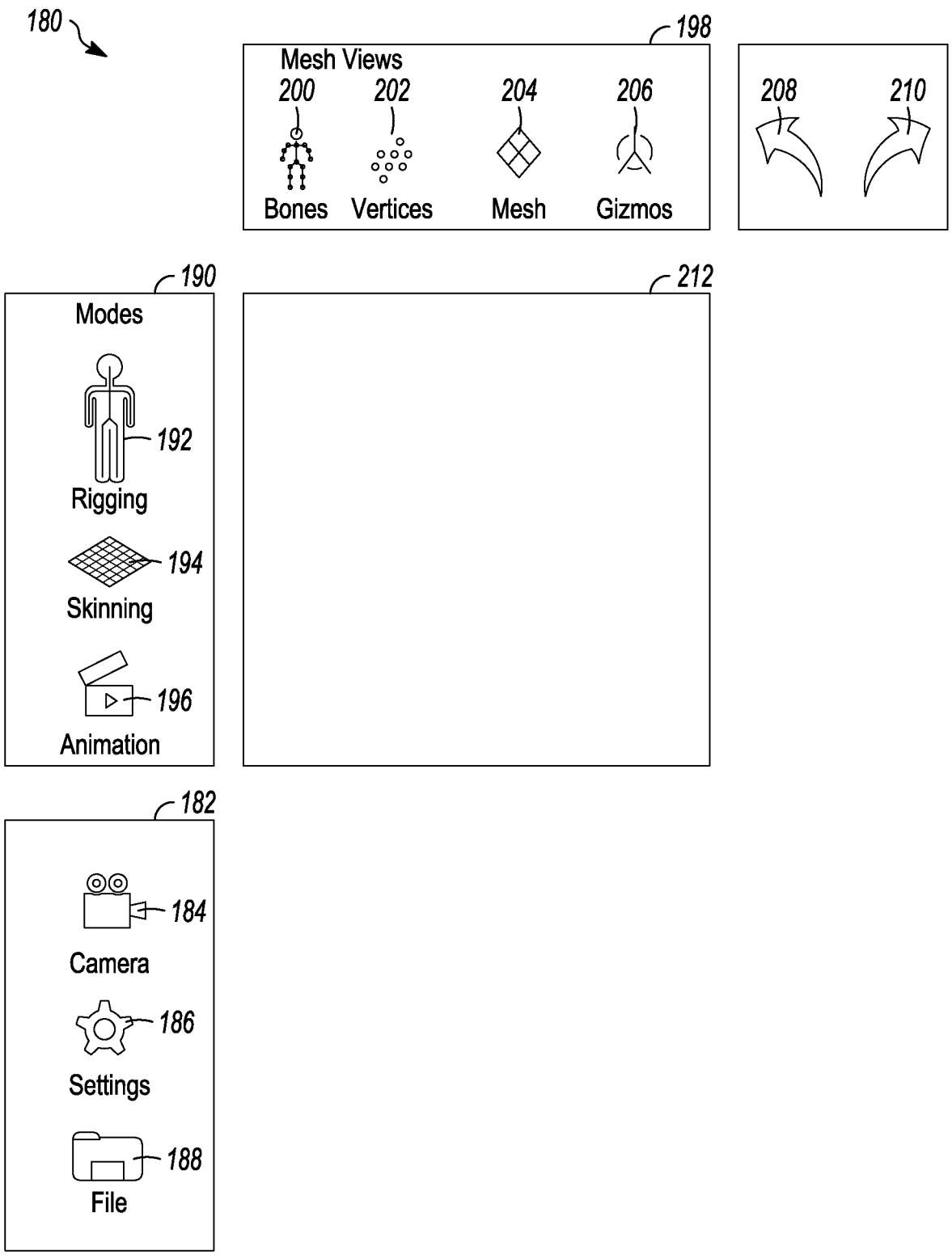
FIG. 5 illustrates an example of a virtual user-interface menu of the virtual user interface of FIG. 4.

Referring to FIG. 5, an example of the virtual user-interface menu 180 is illustrated and includes a main menu 182 including a camera icon 184, a settings icon 186, and a file icon 188. The virtual user-interface menu 180 also includes a modes menu 190 including a rigging icon 192, a skinning icon 194, and an animation icon 196. The virtual user-interface menu 180 also includes a mesh views menu 198 including a bones icon 200, a vertices icon 202, a mesh icon 204, and a gizmos icon 206. The virtual user-interface menu 180 also includes an undo icon 208 and a redo icon 210. The virtual user-interface menu 180 also includes a tools menu 212 that may include icons that may vary depending on a selected mode, and the virtual user-interface menu 180 may include other menus or other icons as described herein, for example.

Figure 6:
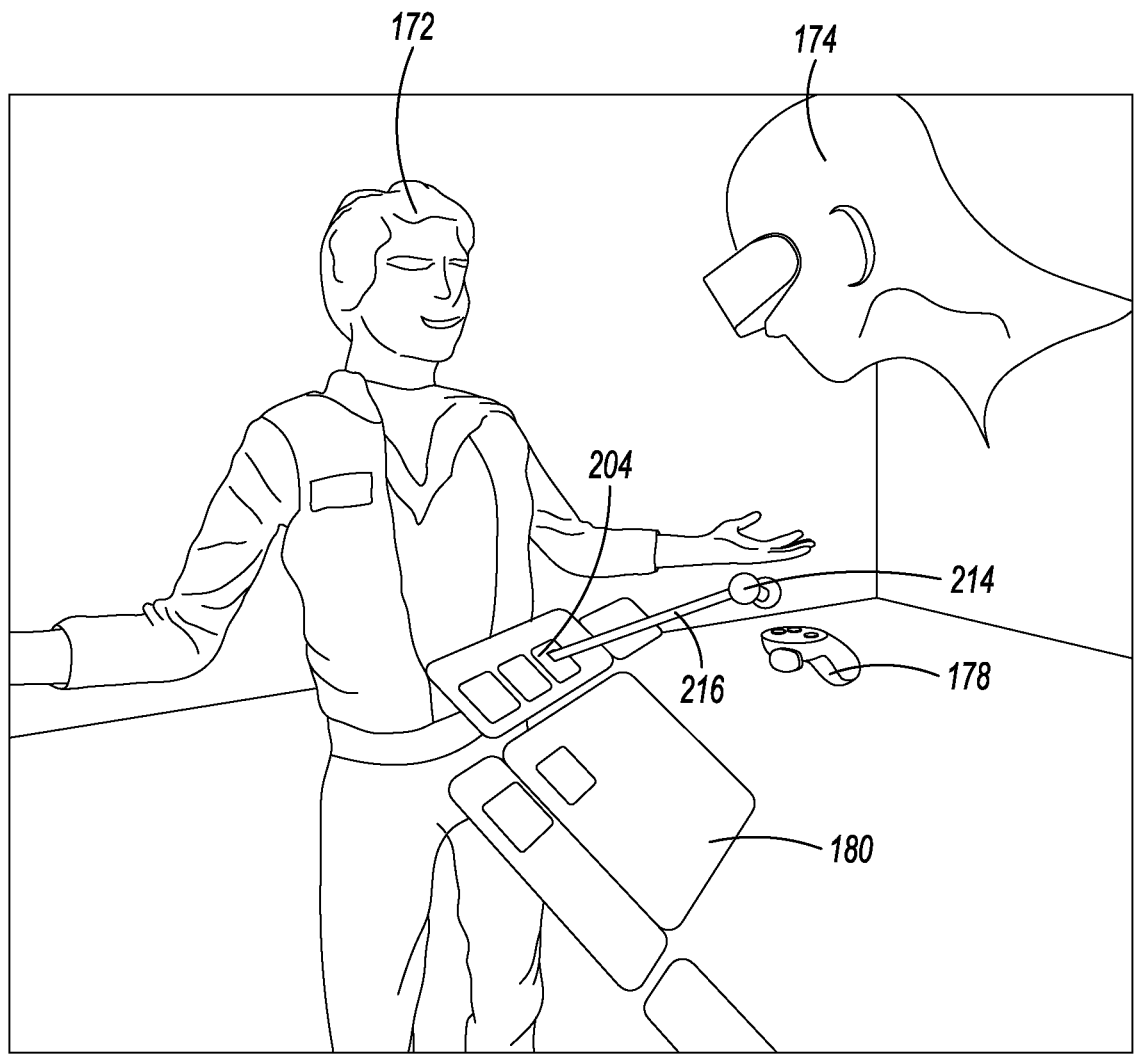
FIG. 6 illustrates another example of the virtual user interface of FIG. 4.

Referring to FIG. 4 and to FIG. 6, the virtual user interface of the embodiment shown also includes an illustration of a virtual pointing device 214. As shown in FIG. 4 and in FIG. 6, the virtual pointing device 214 may appear to the user in the virtual user interface at a position and at an orientation relative to a position and to an orientation of the movement sensor 122. Therefore, in the embodiment shown, if the user holds the movement sensor 122 in the right hand of the user, then movement of the right hand of the user may cause corresponding movement of the movement sensor 122, and in response to one or more signals from the movement sensor 122 indicating the position and the orientation of the movement sensor 122, the virtual user interface program codes 170 may cause the stereoscopic display 112 to display to the user the virtual pointing device 214 in the virtual user interface at a position and at an orientation corresponding to the position and the orientation of the movement sensor 122.

The virtual user interface of FIG. 4 is an example only, and virtual user interfaces of alternative embodiments may differ. For example, alternative embodiments may include fewer, more, or different illustrations, and positions, orientations, or both of one or more illustrations in alternative embodiments may be fixed or may be movable in different ways. Further, virtual user interfaces of alternative embodiments may include alternatives to the virtual user-interface menu 180, to the virtual pointing device 214, or to both.

Referring to FIG. 6, in the embodiment shown, when the virtual pointing device 214 is positioned and oriented to point generally towards the virtual user-interface menu 180, the virtual user interface program codes 170 may cause the stereoscopic display 112 to display to the user in the virtual user interface an icon pointer 216 indicating an icon of the virtual user-interface menu 180 to which the virtual pointing device 214 is pointed. The icon pointer 216 may additionally or alternatively indicate other icons such as other icons described herein, for example. When the virtual pointing device 214 is pointed to an icon of the virtual user-interface menu 180 or to another icon, the user may actuate, select, or deselect the icon, for example by actuation of one or more of the user inputs 130, 132, and 134 of the movement sensor 122.

For example, as indicated above, in the embodiment shown, the storage codes in the model mesh store 166 may identify vertices of a three-dimensional shape and colours or other visible characteristics of faces between such vertices, and the mesh views menu 198 includes the vertices icon 202 and the mesh icon 204. In the embodiment shown, user selection of the vertices icon 202 may cause the illustration 172 to include illustrations of the vertices of the three-dimensional shape, user deselection of the vertices icon 202 may cause the illustration 172 not to include illustrations of the vertices of the three-dimensional shape, user selection of the mesh icon 204 may cause the illustration 172 to include illustrations of the faces of the three-dimensional shape, and user deselection of the mesh icon 204 may cause the illustration 172 not to include illustrations of the faces of the three-dimensional shape. For example, in FIG. 4, the illustration 172 includes illustrations of the vertices of the three-dimensional shape but does not include illustrations of the faces of the three-dimensional shape. As another example, in FIG. 6, the user has selected the mesh icon 204 and thereby has caused the illustration 172 to include illustrations of the faces of the three-dimensional shape.

In general, a rig element as described herein may include one or more control points. A rig element as described herein may define rigid transforms relative to one or more of the control points of the rig element. For example, a rig element as described herein may include a radius having a length (which may be variable but constant during animation) and extending in a direction (which may be variable) from a control point of the rig element. Further, a rig element as described herein may include a rigid shape that may be movable relative to a control point of the rig element. Such a rigid shape may be a single straight line extending radially from the control point, may be a piecewise linear shape including a sequence of straight lines extending from the control point, or may have other shapes extending from a control point of the rig element. Further, a rig element as described herein may include a rotational orientation around the radius. In other words, a rig element as described herein may define rigid transforms as rotation of the radius (or other rigid shape) around a control point of the rig element in one, two, or three degrees of freedom. Such rotation may include rotation around the radius, rotation around one or two axes that are non-parallel and that may be orthogonal to the radius, or both.

A plurality of rig elements may be referred to as a "rig". One or more rig elements in a rig may be movable relative to one or more other rig elements in the rig like movement at a joint, so movement of at least one rig element relative to another rig element may be an example of articulated movement. Further, a plurality of respective directions of rig elements of a rig, of respective orientations of rig elements of the rig, or of both may be referred to as a "pose" of the rig, and for example the pose of a rig may be varied by changing a direction, an orientation, or both of one or more rig elements of the rig. Some or all of the control points of a rig may be within a three-dimensional shape (such as the three-dimensional shape shown in the illustration 172, for example). Additionally or alternatively, some or all of the control points of a rig may be outside of such a three-dimensional shape.

In some embodiments, one of the rig elements as described herein may be a root rig element having a root control point, and some or all of the other rig elements as described herein may be relative rig elements having respective control points that are movable relative to respective other rig elements as described herein. For example, a relative rig element may be defined relative to a parent rig element, which may be the root rig element or another relative rig element, and a control point of a relative rig element may remain at an end of a radius or other shape of a parent rig element at a radial distance (that may be variable but constant during animation) from a control point of the parent rig element, or a control point of a relative rig elements may remain at another configurable point along or relative to a radius or other shape of the parent rig element. Therefore, movement of the root control point or movement of the radius of the root rig element may move all of the rig elements, whereas movement of the radius of a relative rig element may move only the relative rig element and any other relative rig elements having respective control points that are movable relative to the relative rig. Accordingly, rig elements as described herein may represent one or more bones of a three-dimensional shape, may be hierarchical, and may be defined according to a tree structure so that each rig element may have exactly one control point and may have zero, one, or more than one "child" rig elements that are movable relative to the rig element.

In general, definition of at least one parameter of at least one rig element may be referred to as "rigging", and at least one parameter of at least one rig element is an example of a parameter of articulated movement (or, more generally, an animation parameter) that may be defined in response to user interaction with a virtual user interface as described herein. Therefore, referring back to FIG. 3, the program memory 140 may also include rigging program codes 218 including blocks of program codes that, when executed by the microprocessor 138, cause the processor circuit 136 to receive input signals from one or both of the movement sensors 120 and 122 defining one or more parameters of one or more rig elements. In the example described below, one or more parameters of one or more rig elements are defined with reference to the three-dimensional shape shown in the illustration 172. However, in some embodiments, one or more parameters of one or more rig elements may be defined independently of such a three-dimensional shape. Such rig elements may later be associated with a three-dimensional shape.

Figure 7:
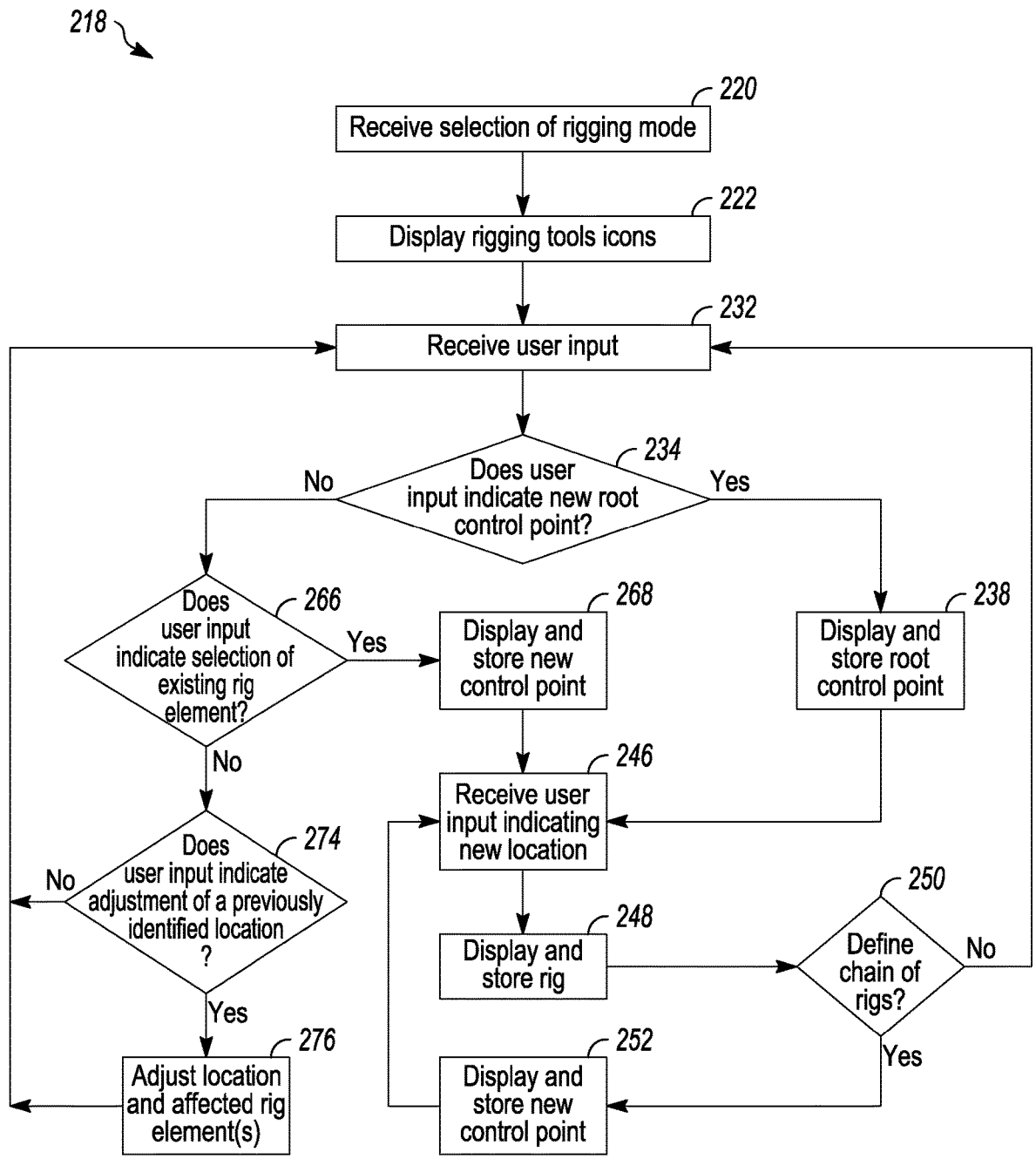
FIG. 7 schematically illustrates rigging program codes of a program memory of the processor circuit of FIG. 3.

Referring to FIG. 7, the rigging program codes 218 are illustrated schematically and may begin at 220 in response to user selection of a rigging mode, for example by actuating one or more of the user inputs 130, 132, and 134 of the movement sensor 122 when the virtual pointing device 214 and the icon pointer 216 point to the rigging icon 192.

Figure 8:
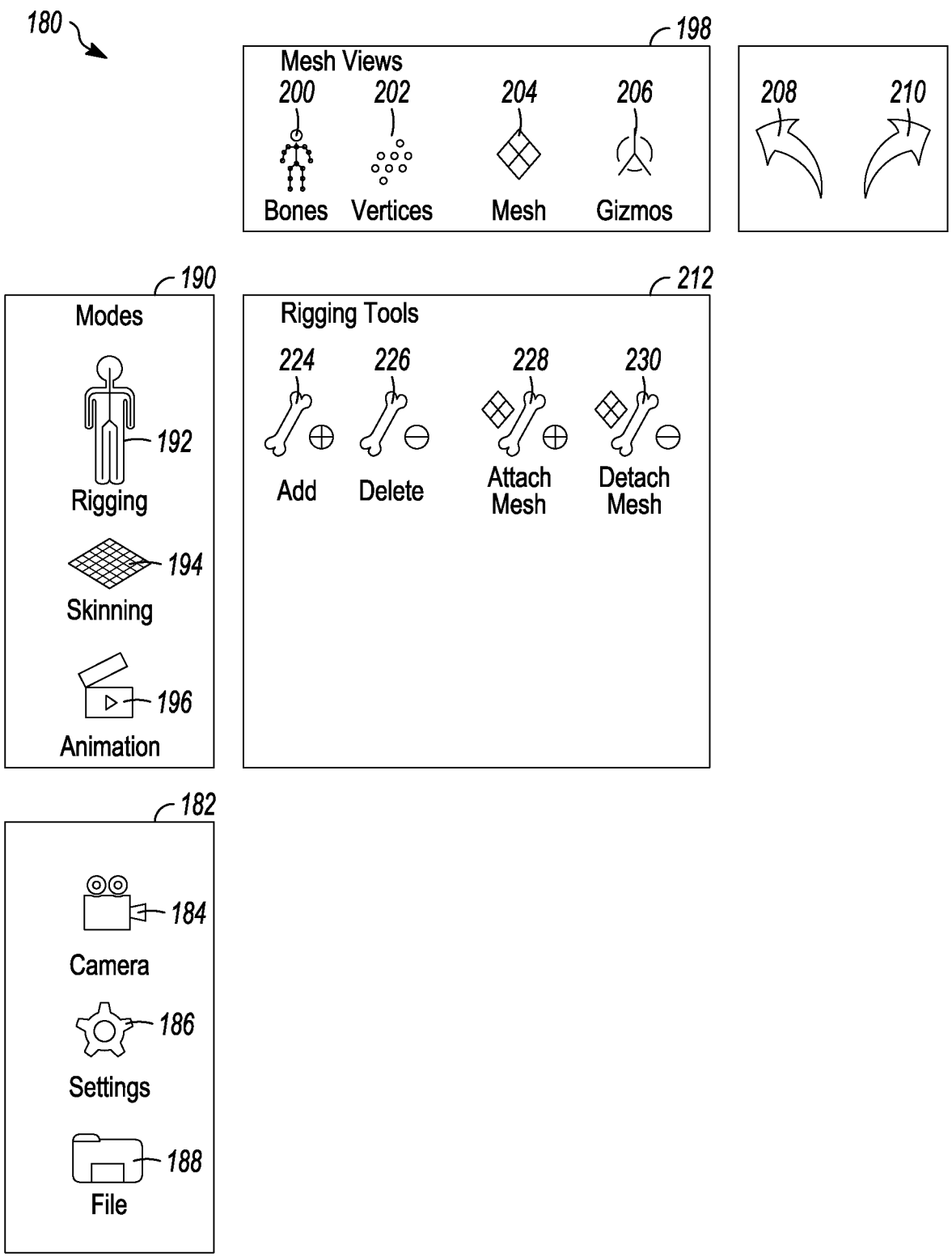
FIG. 8 illustrates an example of rigging tool icons on a tools menu of the virtual user-interface menu of FIG. 5.

The rigging program codes 218 may then continue at block 222, which may include program codes that, when executed by the microprocessor 138, cause the processor circuit 136 to display rigging tool icons on the tools menu 212. For example, as shown in FIG. 8, the rigging tool icons may include an add rig icon 224, a delete rig icon 226, an attach mesh icon 228, and a detach mesh icon 230. The following description of FIG. 7 illustrates functionality of the rigging program codes 218 according to one embodiment when the add rig icon 224 is selected. However, embodiments such as those described herein may have additional functionality, for example when the delete rig icon 226, the attach mesh icon 228, or the detach mesh icon 230 is selected.

After block 222, the rigging program codes 218 may then continue at block 232, which may include program codes that, when executed by the microprocessor 138, cause the processor circuit 136 to receive one or more user input signals, for example from the movement sensor 122. In general, the one or more user input signals received at block 232 may represent movement of the movement sensor 122, user actuation of one or more of the user inputs 130, 132, and 134, or both, for example, and may represent user interaction with the virtual user interface.

Figure 9:
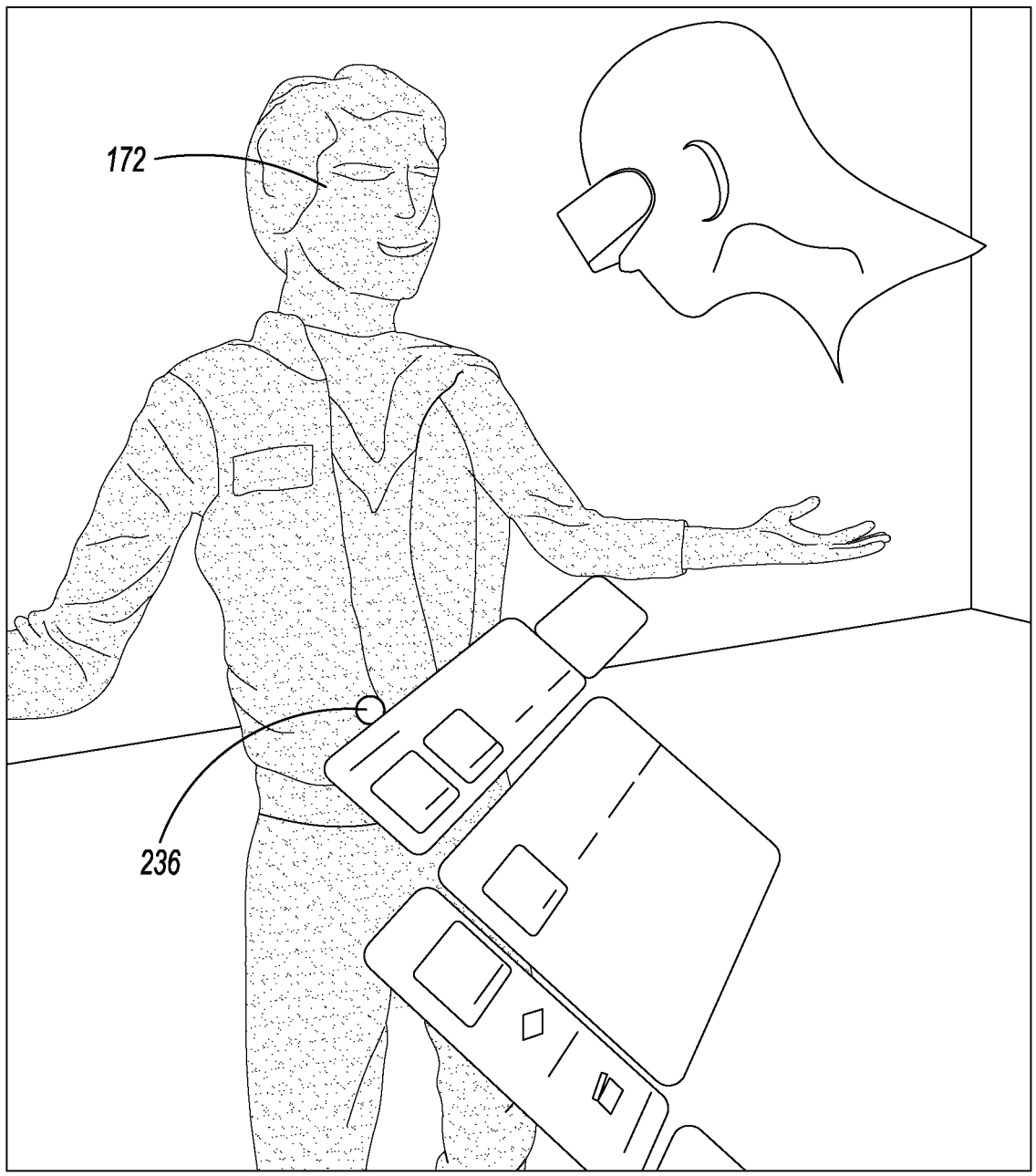
FIG. 9 to FIG. 14 illustrate other examples of the virtual user interface of FIG. 4.

After block 232, the rigging program codes 218 may then continue at block 234, which may include program codes that, when executed by the microprocessor 138, cause the processor circuit 136 to determine whether the one or more user input signals received at block 232 indicate a location of a new root control point, which may or may not be in the three-dimensional shape shown in the illustration 172. For example, user actuation of one or more of the user inputs 130, 132, and 134 when the virtual pointing device 214 points to a location may indicate that the location is a location of a new root control point. Referring to FIG. 9, for example, the virtual pointing device 214 points to a location 236 in the three-dimensional shape shown in the illustration 172, and user actuation of one or more of the user inputs 130, 132, and 134 may indicate that the location 236 is a location of a new root control point, which may or may not be in the three-dimensional shape shown in the illustration 172.

If at block 234 the one or more user input signals received at block 232 do indicate a location of a new root control point, then the rigging program codes 218 may continue at block 238, which may include program codes that, when executed by the microprocessor 138, cause the processor circuit 136 to display (for example, as a spherical icon or otherwise by visibly identifying) the new root control point (in this example, the root control point at the location 236) to the user in the virtual user interface. The program codes at block 238 may additionally or alternatively cause the processor circuit 136 to store, in a rigging store 240 in the storage memory 142, one or more storage codes representing a location (in the embodiment shown, the location 236) of the new root control point in a three-dimensional shape (in the embodiment shown, the three-dimensional shape shown in the illustration 172).

Figure 10:
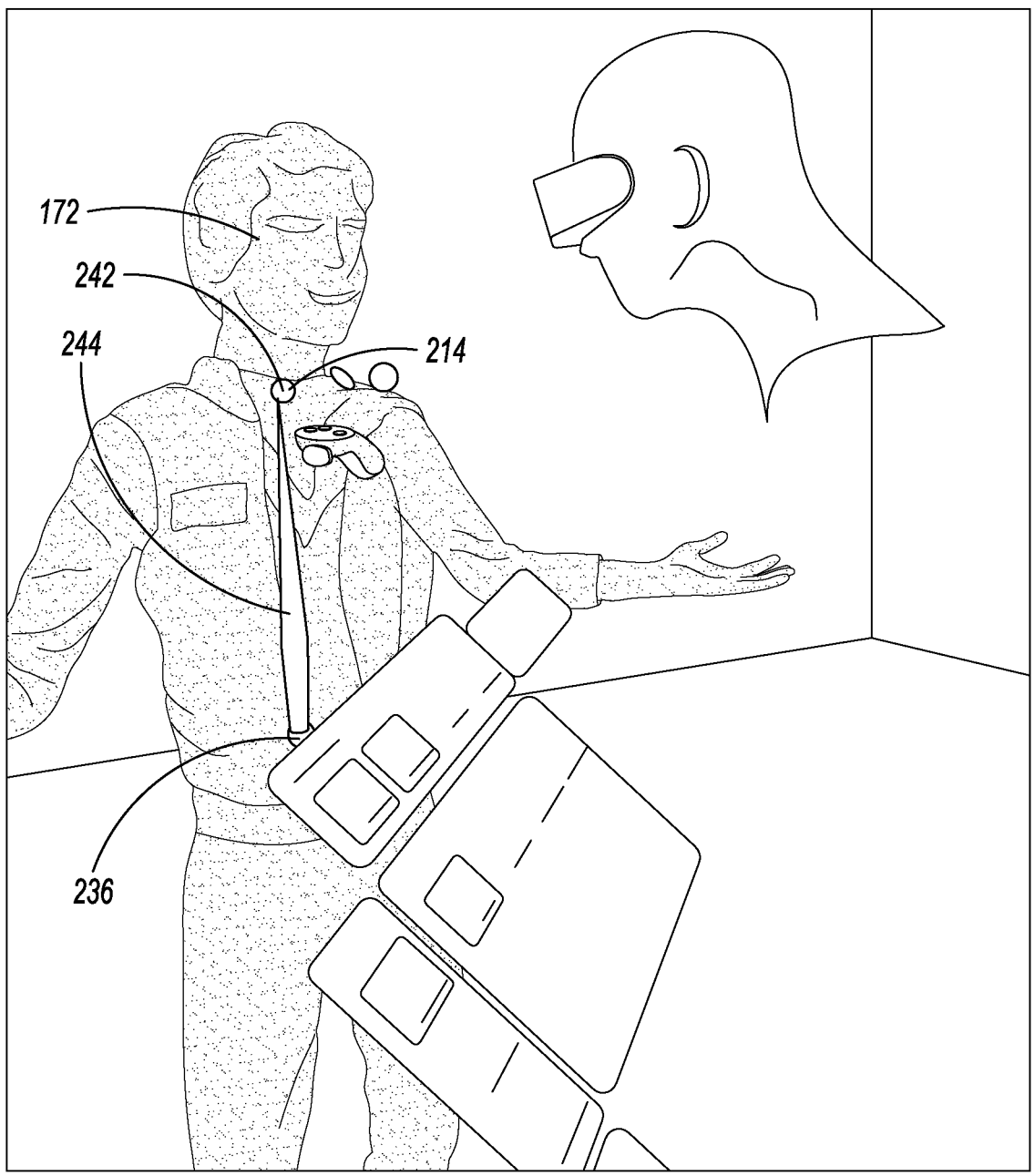

After identifying a location of a new root control point in a three-dimensional shape, the user may then indicate a length and a direction of a radius of a root rig element having the root control point. Therefore, in this example, as shown in FIG. 10, after indicating that the location 236 is a location of a new root control point, the user may move the movement sensor 122 until the virtual pointing device 214 points to a location 242, which may or may not be in the three-dimensional shape shown in the illustration 172, and when the virtual pointing device 214 points to the location 242, the user may indicate that the location 242 (for example, by user actuation of one or more of the user inputs 130, 132, and 134) such that a root rig element 244 has a radius extending between the location 236 and the location 242. In the embodiment shown, the root rig element 244 is a single straight line extending radially from the control point at the location 236 to the location 242. However, as indicated above, rig elements may have a piecewise linear shape including a sequence of straight lines extending from a control point, or may have other shapes extending from the control point.

Therefore, after block 238, the rigging program codes 218 may then continue at block 246, which may include program codes that, when executed by the microprocessor 138, cause the processor circuit 136 to receive user input indicating a location (in this example, the location 242) defining a radius of a rig element (in this example, the root rig element 244) having a most recently identified control point (in this example, the root control point identified at block 232 and stored at block 238).

The rigging program codes 218 may then continue at block 248, which may include program codes that, when executed by the microprocessor 138, cause the processor circuit 136 to display (for example, as an elongate icon or otherwise by visibly identifying) the rig element (in this example, the root rig element 244) defined by the location identified at block 246 to the user in the virtual user interface. The program codes at block 248 may additionally or alternatively cause the processor circuit 136 to store, in the rigging store 240, one or more storage codes representing the radius defined by the location identified at block 246. In the embodiment shown, the program codes at block 248 cause the processor circuit 136 to store, in the rigging store 240, one or more storage codes representing a length (or, more generally, a shape or dimension) and a direction of the radius of the root rig element 244 extending between the location 236 and the location 242, although alternative embodiments may differ.

After defining a rig element, as described above for example, the user may identify relative rig elements having respective control points that are movable relative to the most recently identified rig element, thereby defining a chain of rig elements. For example, after defining a rig element at block 246, user actuation of one or more of the user inputs 130, 132, and 134 (or a lack of user actuation of any of the user inputs 130, 132, and 134) may indicate defining a chain of rig elements, or user actuation of one or more of the user inputs 130, 132, and 134 (or a lack of user actuation of any of the user inputs 130, 132, and 134) may indicate not defining a chain of rig elements.

Therefore, after block 248, the rigging program codes 218 may then continue at block 250, which may include program codes that, when executed by the microprocessor 138, cause the processor circuit 136 to determine whether the user is defining a chain of rig elements, for example in response to user actuation of one or more of the user inputs 130, 132, and 134 or in response to a lack of user actuation of any of the user inputs 130, 132, and 134. If at block 250 the user is not defining a chain of rig elements, then the rigging program codes 218 may return to block 232.

Figure 11:
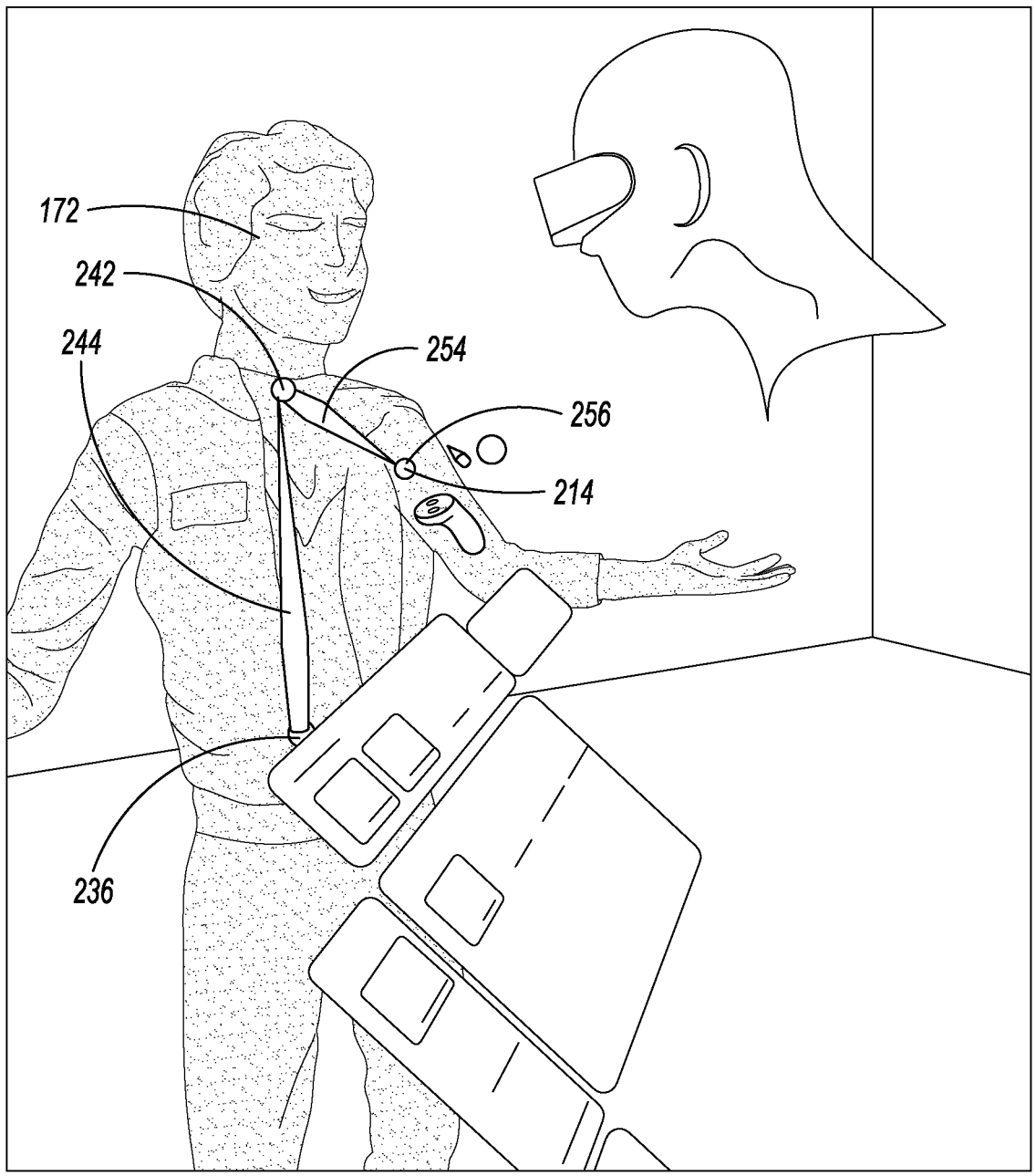

However, if at block 250 the user is defining a chain of rig elements, then the location identified at block 246 may not only define the radius of the previously defined rig element, but may also identify a control point of a subsequent and relative rig element. Therefore, if at block 250 the user is defining a chain of rig elements, then the rigging program codes 218 may continue at block 252, which may include program codes that, when executed by the microprocessor 138, cause the processor circuit 136 to display (for example, as a spherical icon or otherwise by visibly identifying) the new control point that may or may not be in the three-dimensional shape shown in the illustration 172 (in the example shown, a control point at the location 242 as identified at block 246) to the user in the virtual user interface. The program codes at block 252 may additionally or alternatively cause the processor circuit 136 to store, in the rigging store 240, one or more storage codes representing the location (in the example shown, the location 242 as identified at block 246) of a control point of a new rig element (in the example shown, a rig element 254 as shown in FIG. 11).

Figure 12:
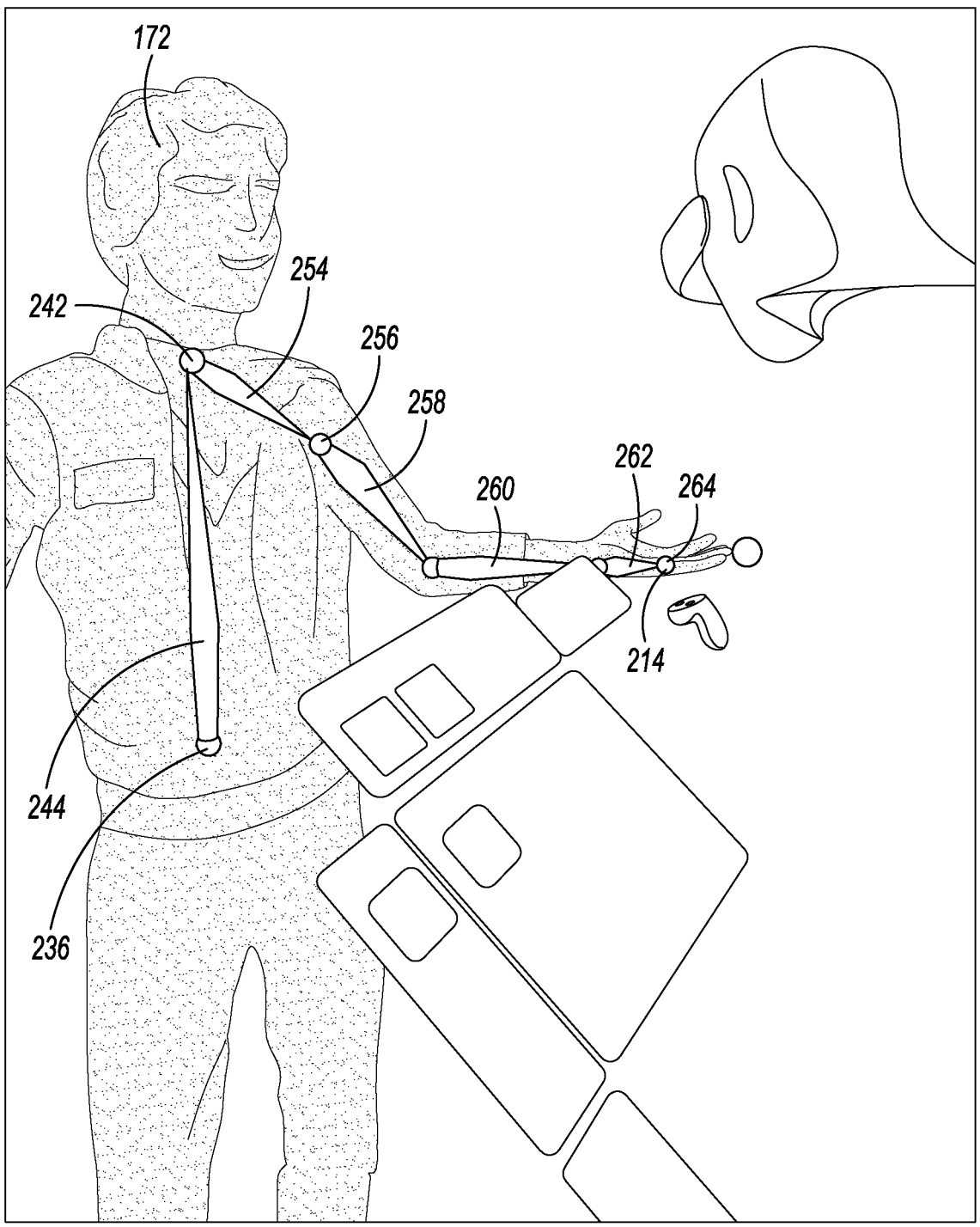

After block 252, the rigging program codes 218 may then return to block 246 to receive an identification (for example, from a location pointed to by the virtual pointing device 214) of a location (such as a location 256 in the example shown in FIG. 11) defining a radius of the most recently identified rig element (in this example, the rig element 254 having the control point identified at block 252). In the embodiment shown, blocks 246, 248, 250, and 252 may repeat to define a chain of rig elements such as the chain of rig elements 244, 254, 258, 260, and 262 in the example shown in FIG. 12. Again, in the embodiment shown, the rig elements 244, 254, 258, 260, and 262 are each a single straight line extending radially from respective control points, but rig elements may have a piecewise linear shape or other shapes extending from the control point. In the example shown in FIG. 12, after identifying at block 246 a location 264 defining a radius of the last rig element 262 of the chain, the user may indicate at block 250 that the user is no longer defining a chain of rig elements, and as indicated above, the rigging program codes 218 may then return to block 232.

In addition to defining a chain of rig elements as described above, the user may also define rig elements having respective control points that are movable relative to other previously defined rig elements. Therefore, if at block 234 the one or more user input signals received at block 232 do not indicate a location of a new root control point, then the rigging program codes 218 may continue at block 266, which may include program codes that, when executed by the microprocessor 138, cause the processor circuit 136 to determine whether the one or more user input signals received at block 232 indicate selection of a previously defined rig element represented by one or more storage codes in the rigging store 240, for example by actuation of one or more of the user inputs 130, 132, and 134 of the movement sensor 122 when the virtual pointing device 214 is near the selected previously defined rig element.

Figure 13:
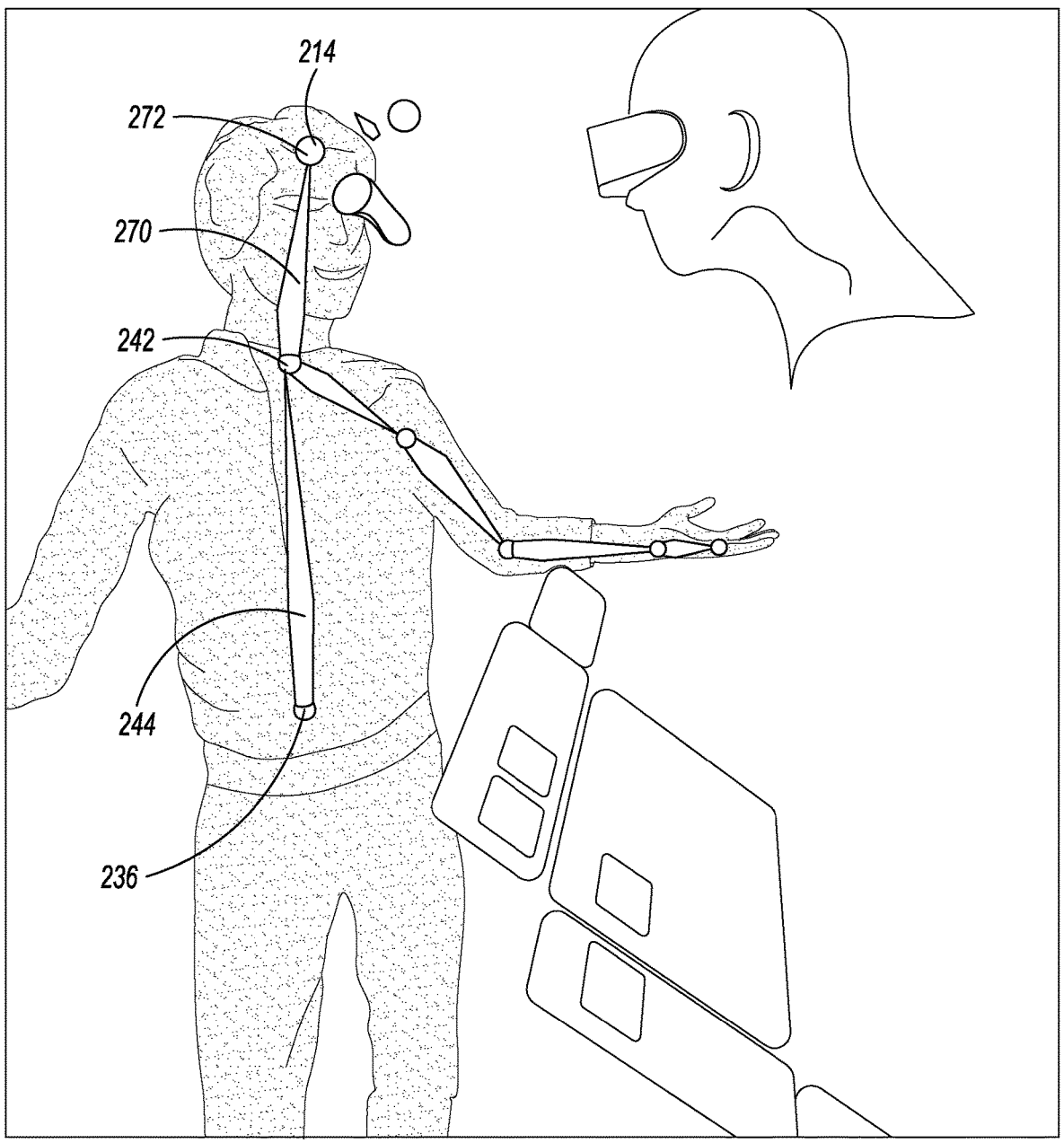

If at block 266 the one or more user input signals received at block 232 do indicate a location of a previously defined rig element, then the rigging program codes 218 may continue at block 268, which may include program codes that, when executed by the microprocessor 138, cause the processor circuit 136 to display (for example, as a spherical icon or otherwise by visibly identifying) the new control point (in the example shown, a control point at the location 242 as identified at block 232) to the user in the virtual user interface. The program codes at block 268 may additionally or alternatively cause the processor circuit 136 to store, in the rigging store 240, one or more storage codes representing the location (in the example shown, the location 242 as identified at block 232) of a control point of a new rig element (in the example shown, a rig element 270 as shown in FIG. 13). After block 268, the rigging program codes 218 may return to block 246, in this example to identify a location 272 to define a radius of the rig element 270 as shown in FIG. 13.

In addition to defining rig elements as described above, the user may also adjust an existing control point. Therefore, if at block 266 the one or more user input signals received at block 232 do not indicate a location of a previously defined rig element, then the rigging program codes 218 may continue at block 274, which may include program codes that, when executed by the microprocessor 138, cause the processor circuit 136 to determine whether the one or more user input signals received at block 232 indicate adjustment of a previously identified location, such as a previously identified control point or a previously identified location defining a radius of a rig element. For example, actuation of one or more of the user inputs 130, 132, and 134 of the movement sensor 122 when the virtual pointing device 214 is near a previously identified location may indicate adjustment of the previously identified location.

Figure 14:
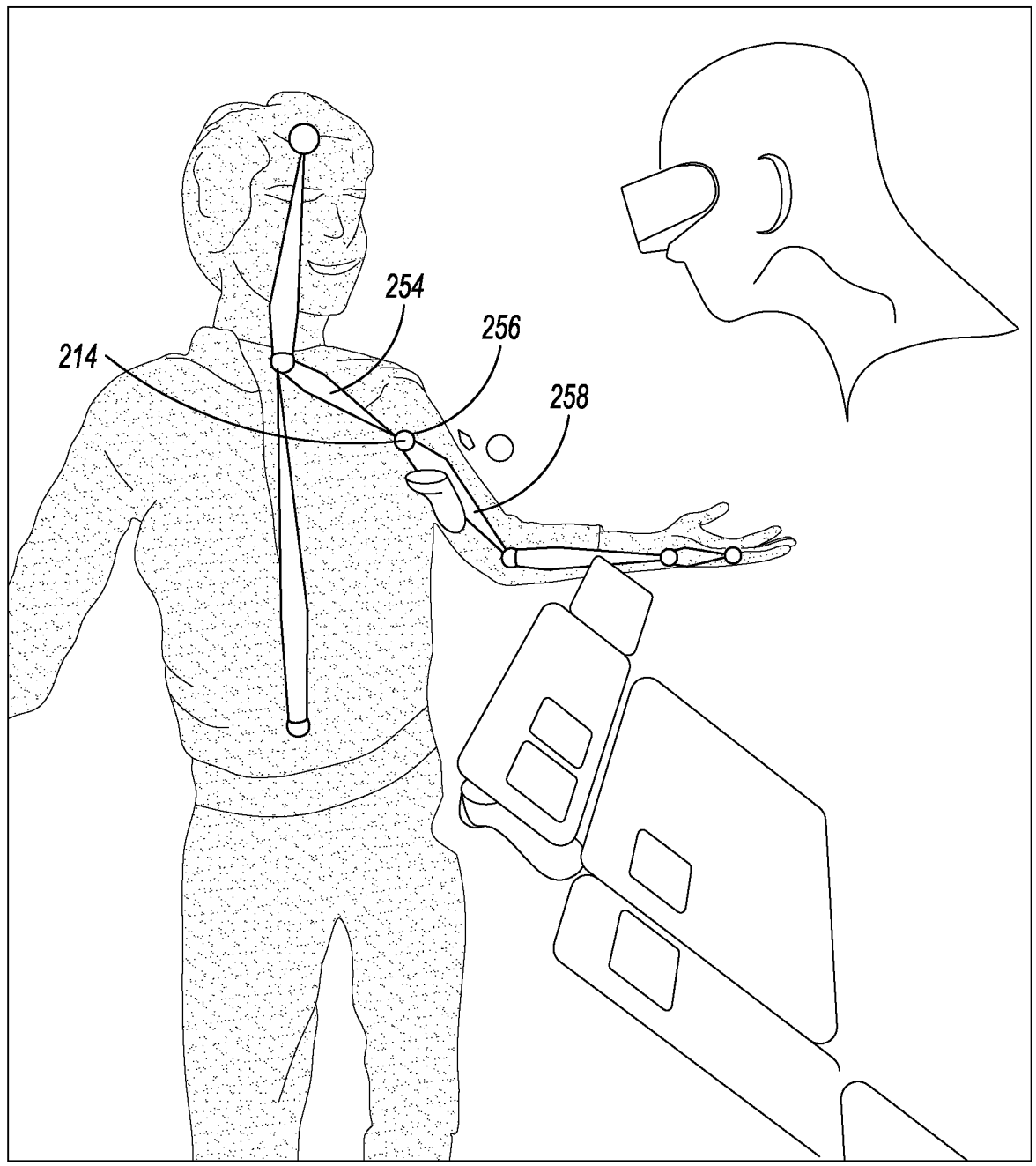

If at block 274 the one or more user input signals received at block 232 do indicate adjustment of a previously identified location, then the rigging program codes 218 may continue at block 276, which may include program codes that, when executed by the microprocessor 138, cause the processor circuit 136 to adjust the storage codes in the rigging store 240 of one or more existing rig elements to reflect the adjustment of the location identified at block 232. For example, in the example of FIG. 14, the one or more user input signals received at block 232 indicated selection of the location 256 and indicated an adjustment to the location 256. Therefore, in the example of FIG. 14, the program codes at block 276 caused the processor circuit 136 to adjust the storage codes representing the rig elements 254 and 258 in the rigging store 240 to reflect the adjustment to the location 256.

If at block 274 the one or more user input signals received at block 232 do not indicate adjustment of a previously identified location, then the rigging program codes 218 may return to block 232. However, the rigging program codes 218 are an example only, and alternative embodiments may differ. For example, alternative embodiments may include more, fewer, or different blocks of code, and may include blocks of code in a different order. Further, embodiments such as those described herein may have additional functionality, for example when the delete rig icon 226, the attach mesh icon 228, or the detach mesh icon 230 is selected. Further, in some embodiments, rigging may be previously defined, and some embodiments may involve only adjustment of previously defined rigging parameters, only defining locations of control points of a previously defined rig in a three-dimensional shape (in the three-dimensional shape shown in the illustration 172, for example), or both. For example, such embodiments may involve adjusting shapes or dimensions of one or more rig elements of a previously defined rig, either in a three-dimensional shape or independently from a three-dimensional shape.

Rigging in other embodiments may vary. For example, in some embodiments, user input (from one or both of the movement sensors 120 and 122, for example) may indicate possible movement of a three-dimensional shape (such as the three-dimensional shape shown in the illustration 172, for example), and at least one parameter of at least one rig element may be defined in response to such movement. For example, in one embodiment, the virtual user interface may include an illustration of a virtual shape moving tool, that may for example resemble the virtual skinning tool 306 described below. In such an embodiment, moving the movement sensor 122 while one or more of the user inputs 130, 132, and 134 is actuated may move any vertices of a three-dimensional shape that are surrounded or contacted by such a virtual shape moving tool may move according to the movement of the movement sensor 122, and much movement may indicate possible movement of the three-dimensional shape. In such embodiments, in response to user input indicating such possible movement, program codes in the program memory 140 may, when executed by the microprocessor 138, cause the processor circuit 136 to infer locations of control points, shapes or dimensions of rig elements, other rigging parameters, or a combination of two or more thereof (such that the rig thus inferred defines possible movement according to the user input) and to store storage codes representing such rigging parameters in the rigging store 240.

In general, a surface element (such as a vertex of a mesh as described herein, for example) may be associated with one or more rig elements with weights that may define a respective degree of influence of movement of each of the associated rig elements to movement of the surface element. For example, a surface element that is near a rig element representing a femur of an animated human may be associated with the rig element with a weight of 100%, so that movement of the rig element contributes to 100% of movement of the surface element. As another example, a surface element that is near a rig element representing a femur of an animated human, but that is even closer to a rig element representing a shin of the animated human, may be associated with the rig element representing the shin with a weight of 75% and may be associated with the rig element representing the femur with a weight of 25%, so that movement of the rig element representing the shin contributes to 75% of movement of the surface element and movement of the rig element representing the femur contributes to 25% of movement of the surface element. Such association of at least one surface element of at least one three-dimensional shape with at least one of a plurality of rig elements may be referred to as "skinning" and is another example of a parameter of articulated movement (or, more generally, an animation parameter) that may be defined in response to user interaction with a virtual user interface as described herein.

Therefore, referring back to FIG. 3, the program memory 140 may also include skinning program codes 278 including blocks of program codes that, when executed by the microprocessor 138, cause the processor circuit 136 to receive input signals from one or both of the movement sensors 120 and 122 defining at least one association of at least one surface element (such as vertices of a mesh, for example) of at least one three-dimensional shape (such as the three-dimensional shape shown in the illustration 172 in the example shown) with at least one of a plurality of rig elements (such as the rig elements represented by storage codes in the rigging store 240, for example).

Figure 15:
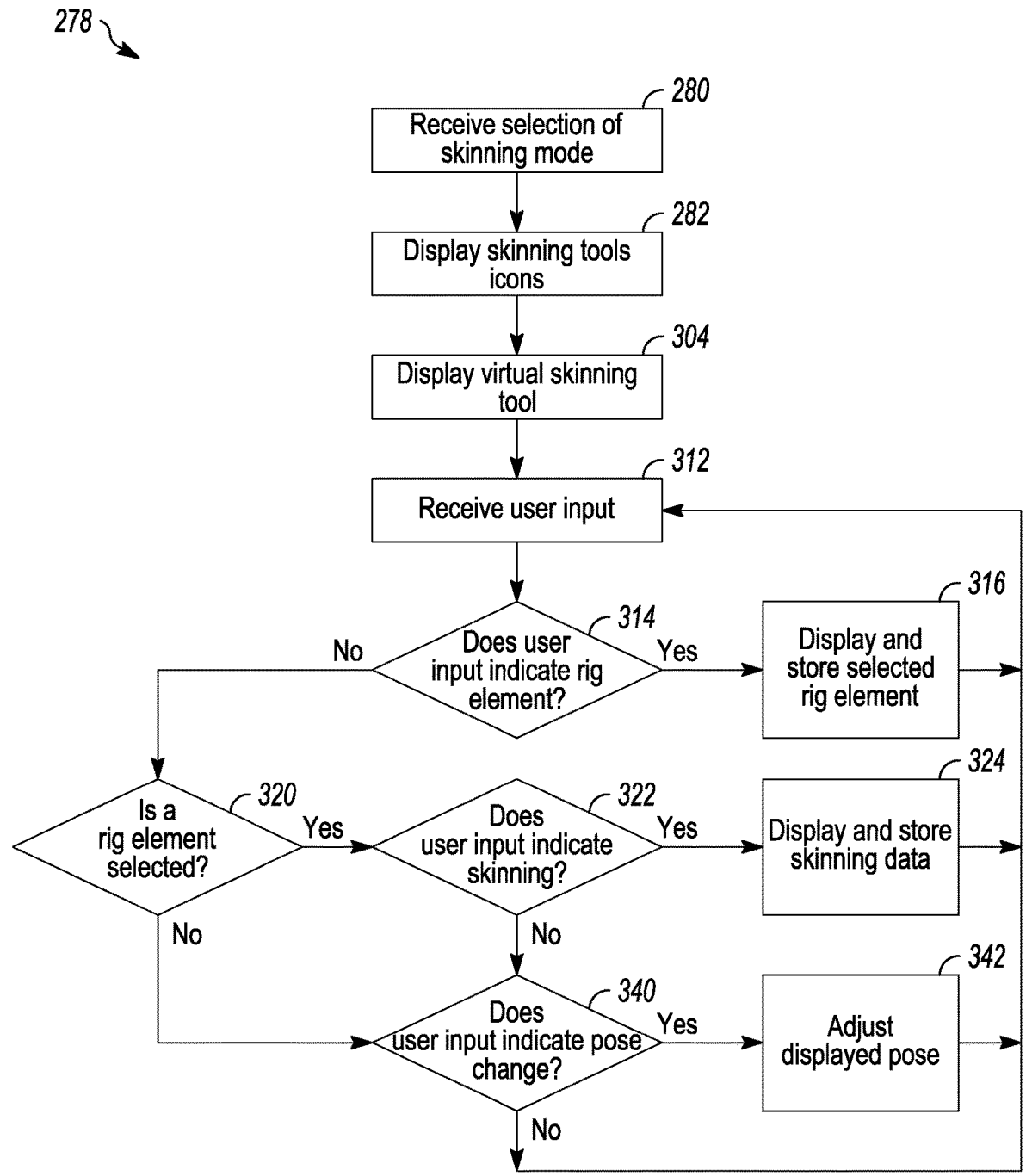
FIG. 15 schematically illustrates skinning program codes of the program memory of the processor circuit of FIG. 3.
Figure 16:
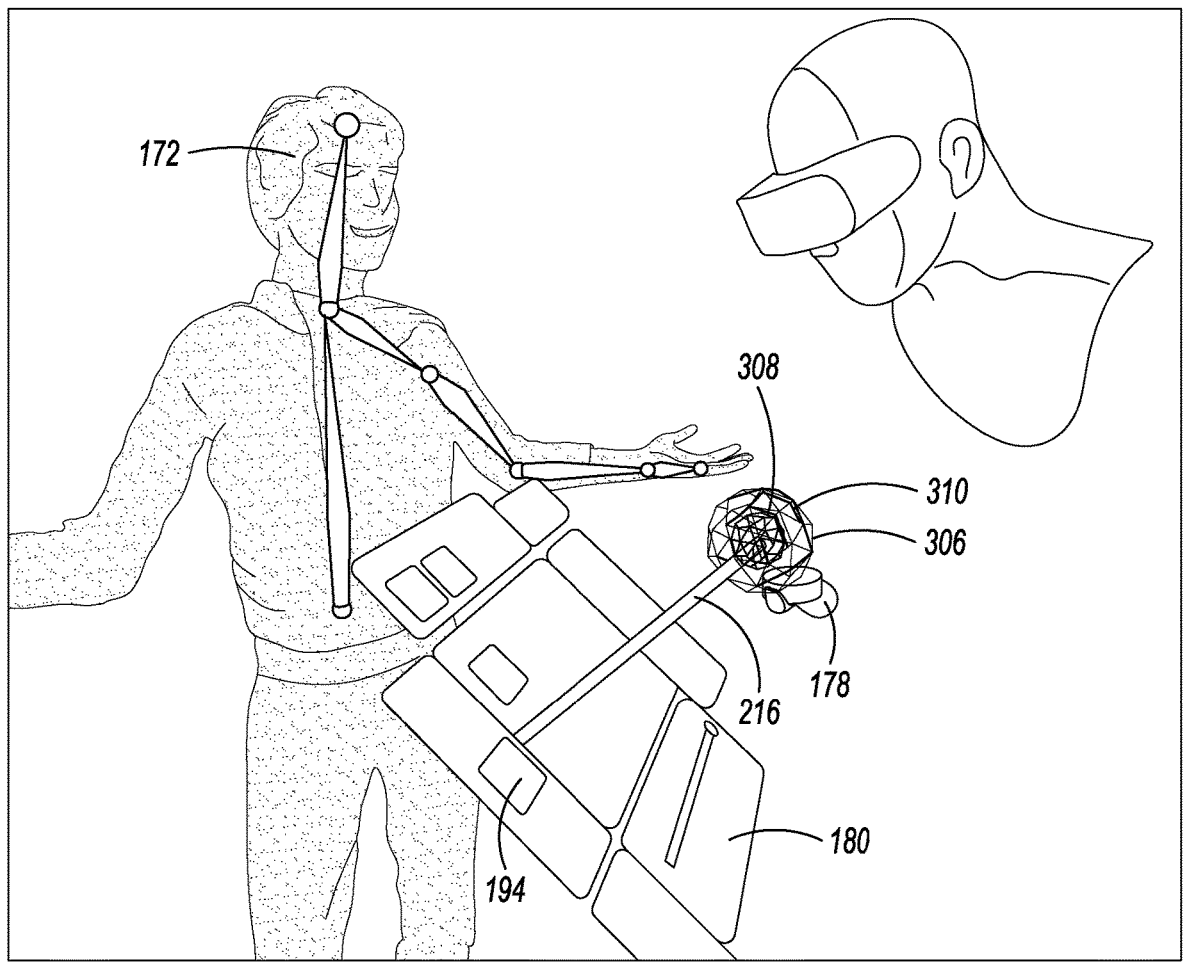
FIG. 16 illustrates another example of the virtual user interface of FIG. 4.

Referring to FIG. 15, the skinning program codes 278 are illustrated schematically and may begin at 280 in response to user selection of a skinning mode, for example by actuating one or more of the user inputs 130, 132, and 134 of the movement sensor 122 when the virtual pointing device 214 and the icon pointer 216 point to the skinning icon 194, as shown in FIG. 16.

Figure 17:
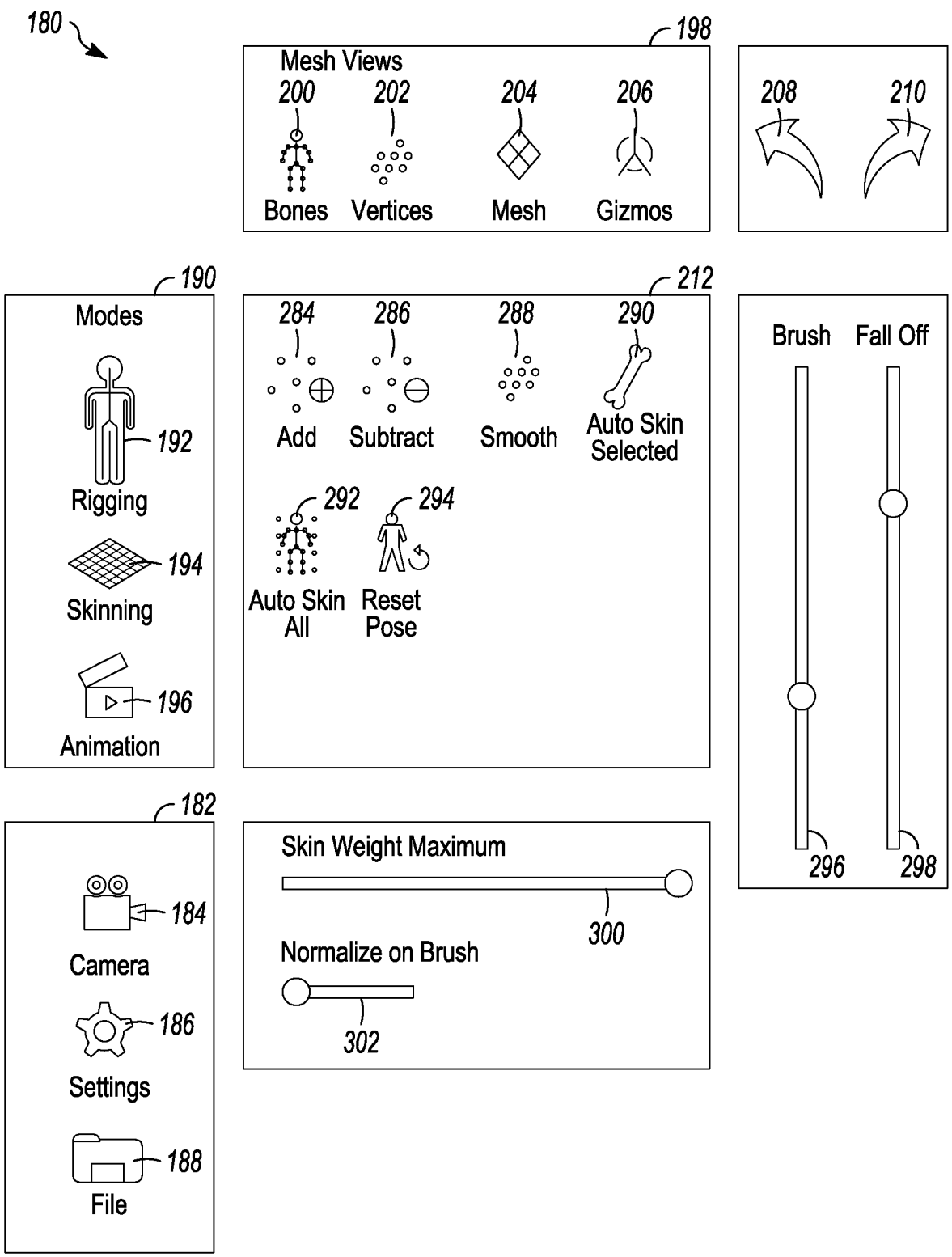
FIG. 17 illustrates an example of rigging tool icons and other icons of the virtual user-interface menu of FIG. 5.

The skinning program codes 278 may then continue at block 282, which may include program codes that, when executed by the microprocessor 138, cause the processor circuit 136 to display skinning tool icons on the tools menu 212. For example, as shown in FIG. 17, the skinning tool icons may include an add skinning icon 284, a subtract skinning icon 286, a smooth skinning icon 288, an auto-skin selected rig icon 290, an auto-skin all rigs icon 292, and a reset pose icon 294. Further, in the embodiment shown, the program codes at block 282 may cause the processor circuit 136 to display, in the virtual user-interface menu 180, a brush size selection icon 296, a falloff size selection icon 298, a skin weight maximum amount selection icon 300, and a normalize on brush selection icon 302. The following description of FIG. 15 illustrates functionality of the skinning program codes 278 according to one embodiment when the add skinning icon 284 is selected, which may be referred to as "manual" skinning. However, embodiments such as those described herein may have additional functionality, for example when one or more other skinning tool icons are selected.

After block 282, the skinning program codes 278 may then continue at block 304, which may include program codes that, when executed by the microprocessor 138, cause the processor circuit 136 to include, in the virtual user interface, an illustration of a virtual skinning tool 306. As shown in FIG. 16, for example, the virtual skinning tool 306 may, like the virtual pointing device 214 as described above, appear to the user in the virtual user interface at a position and at an orientation relative to a position and to an orientation of the movement sensor 122. Further, as shown in FIG. 16, for example, the virtual skinning tool 306 may be generally spherical and may include an inner generally spherical brush 308 and a falloff region between the inner generally spherical brush 308 and an outer generally spherical brush 310 surrounding the inner generally spherical brush 308. In some embodiments, a radius of the virtual skinning tool 306 or a radius of the inner generally spherical brush 308 may be determined by user input using the brush size selection icon 296, and a falloff region thickness (for example, an amount by which a radius of the outer generally spherical brush 310 exceeds the radius of the inner generally spherical brush 308) may be determined by user input using the falloff size selection icon 298. However, the virtual skinning tool 306 is an example only, and alternative embodiments may differ. For example, alternative embodiments may include a virtual skinning tool that may not necessarily be generally spherical, that may not necessarily include a falloff range, and that may have one or more dimensions that may be fixed or that may be variable in other ways. Further, in some embodiments, skinning may be previously defined, and some embodiments may involve only adjustment of previously defined skinning parameters.

After block 304, the skinning program codes 278 may then continue at block 312, which may include program codes that, when executed by the microprocessor 138, cause the processor circuit 136 to receive one or more user input signals, for example from the movement sensor 122. In general, the one or more user input signals received at block 312 may represent movement of the movement sensor 122, user actuation of one or more of the user inputs 130, 132, and 134, or both, for example, and may represent user interaction with the virtual user interface.

After block 312, the skinning program codes 278 may then continue at block 314, which may include program codes that, when executed by the microprocessor 138, cause the processor circuit 136 to determine whether the one or more user input signals received at block 312 indicate selection of one of the rig elements represented by storage codes in the rigging store 240. For example, at block 312, one of the rig elements may be selected when the virtual pointing device 214 is near the one of the rig elements, and user actuation of one or more of the user inputs 130, 132, and 134 may additionally or alternatively identify a selected one of the rig elements.

Figure 18:
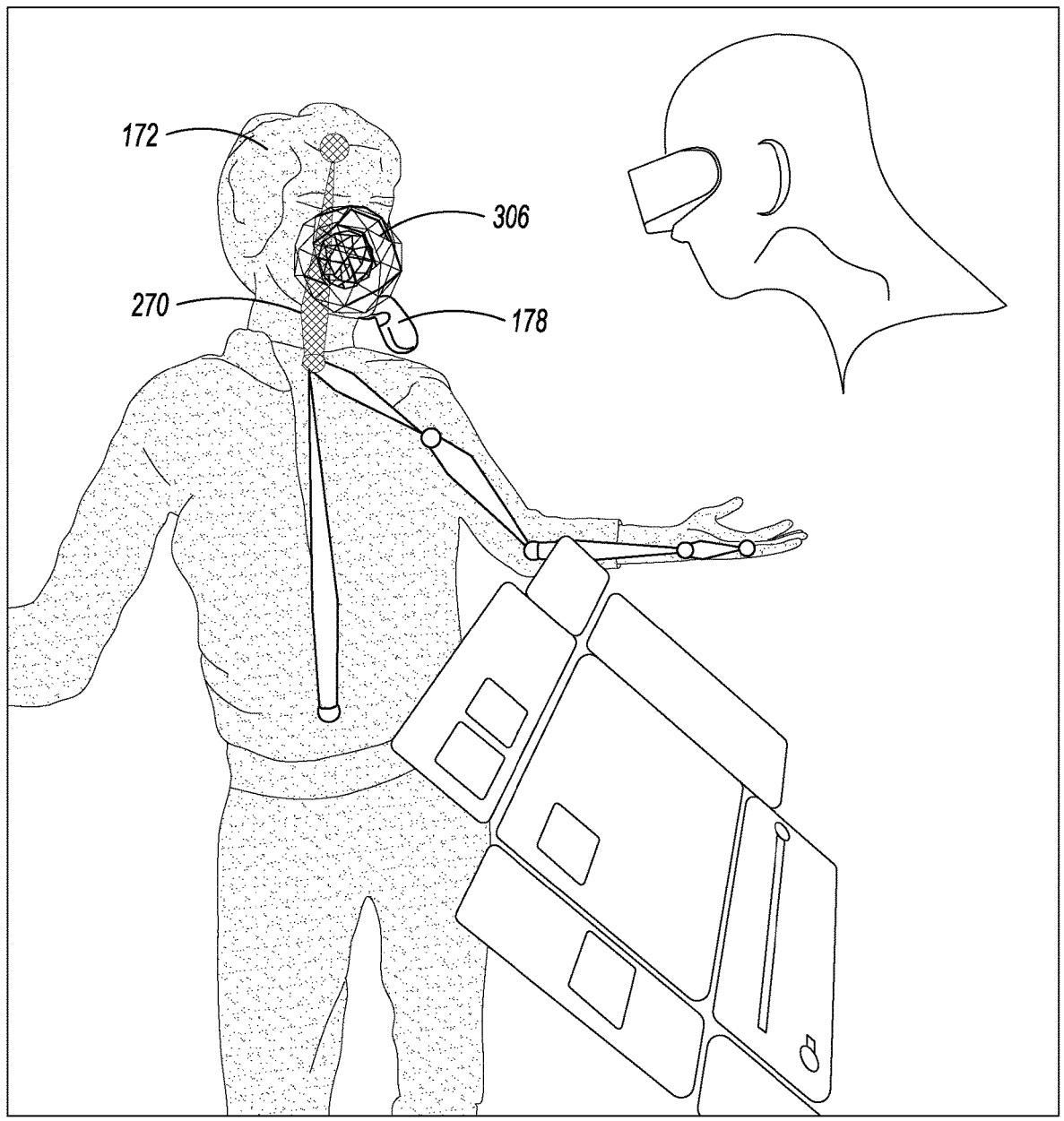
FIG. 18 illustrates another example of the virtual user interface of FIG. 4.

If at block 314 the one or more user input signals received at block 312 do indicate selection of one of the rig elements, then the skinning program codes 278 may continue at block 316, which may include program codes that, when executed by the microprocessor 138, cause the processor circuit 136 to identify the selected one of the rig elements in the illustration 172. For example, FIG. 18 illustrates an example in which the user has selected the rig element 270 at block 312. In the embodiment shown, the selected rig element may be identified by displaying the selected rig element in a different colour than the other rig elements, or more generally by visibly distinguishing the selected rig element from the other rig elements. The program codes at block 316 may additionally or alternatively cause the processor circuit 136 to store one or more storage codes identifying the selected rig element in a selected rig element store 318 in the storage memory 142. After block 316, the skinning program codes 278 may then return to block 312.

If at block 314 the one or more user input signals received at block 312 do not indicate selection of one of the rig elements, then the skinning program codes 278 may continue at block 320, which may include program codes that, when executed by the microprocessor 138, cause the processor circuit 136 to determine whether the selected rig element store 318 indicates that a rig element has been selected.

If at block 320 a rig element has been selected, then the skinning program codes 278 may continue at block 322, which may include program codes that, when executed by the microprocessor 138, cause the processor circuit 136 to determine whether the one or more user input signals received at block 312 indicate skinning. For example, at block 312, the one or more user input signals may indicate skinning when the virtual skinning tool 306 is positioned to surround or contact at least one vertex of at least one three-dimensional shape (in the example shown, at least one vertex identified in the model mesh store 166 of the three-dimensional shape of the illustration 172) and when at least one of the user inputs 130, 132, and 134 is actuated.

If at block 322 the one or more user input signals received at block 312 do indicate skinning, then the skinning program codes 278 may continue at block 324, which may include program codes that, when executed by the microprocessor 138, cause the processor circuit 136 to display the skinning in the illustration 172, to store one or more storage codes representing the skinning in a skinning store 326 in the storage memory 142, or both.

As indicated above, in the embodiment shown, the virtual skinning tool 306 includes the inner generally spherical brush 308 and a falloff region between the inner generally spherical brush 308 and the outer generally spherical brush 310. In the embodiment shown, when the virtual skinning tool 306 is positioned to surround or contact at least one vertex of at least one three-dimensional shape, and when at least one of the user inputs 130, 132, and 134 is actuated, the program codes at block 324 may assign a weight to each of the at least one vertex according to a function of a distance from a center (or reference point) of the virtual skinning tool 306 to the vertex.

Figure 19:
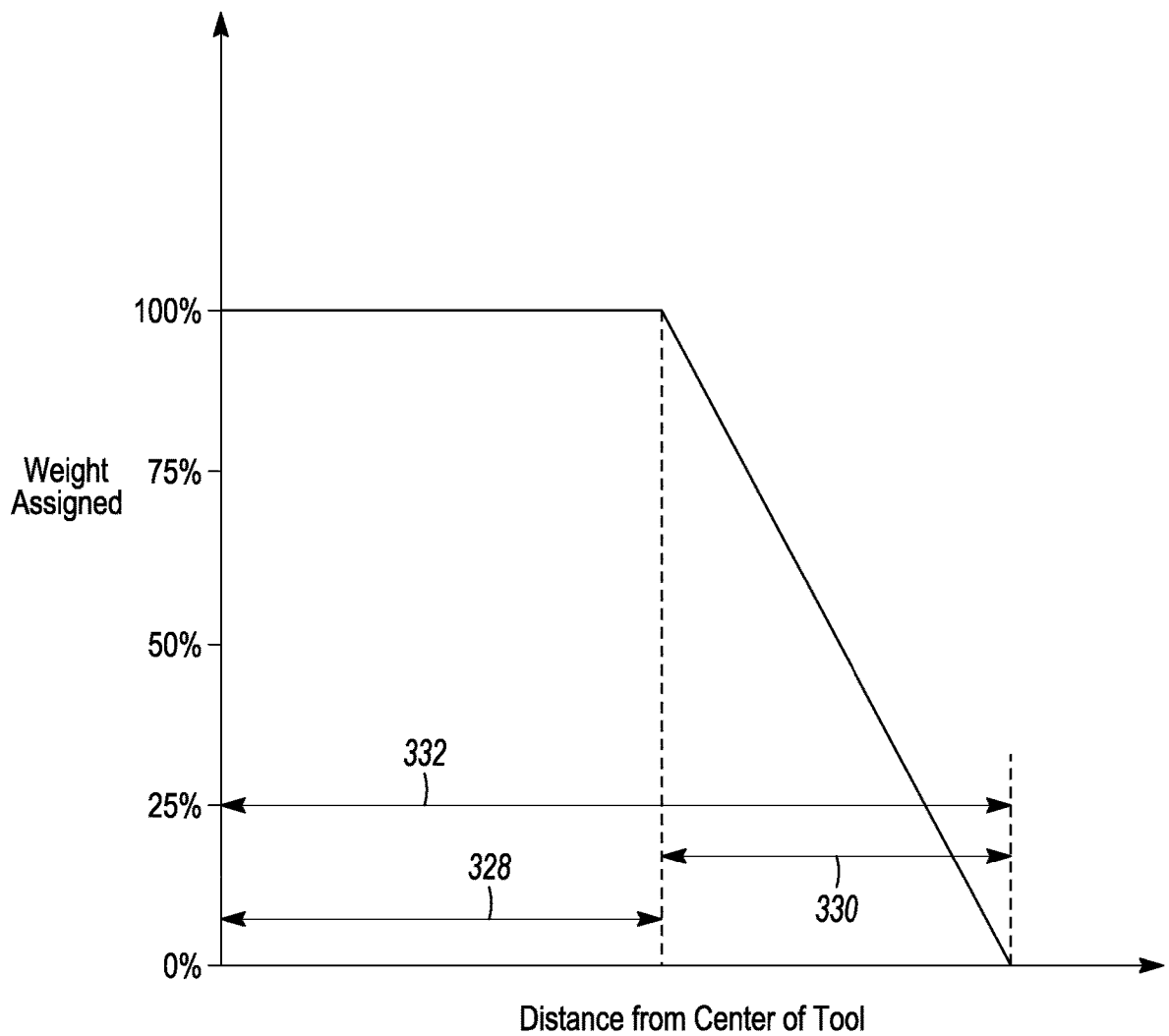
FIG. 19 illustrates a function of a skinning tool of the virtual user interface of FIG. 4.

An example of such a function according to one embodiment is shown in FIG. 19. According to such a function, when the virtual skinning tool 306 is positioned to surround or contact at least one vertex of at least one three-dimensional shape, and when at least one of the user inputs 130, 132, and 134 is actuated, the program codes at block 324 assign a weight of 100% to any vertex that is at a distance from the center of the virtual skinning tool 306 in a range that is less than or equal to a radius 328 of the inner generally spherical brush 308, and to any vertex that is in a falloff range 330 at a distance from the center of the virtual skinning tool 306 that is greater than the radius of the inner generally spherical brush 308 but less than or equal to a radius 332 of the outer generally spherical brush 310, assign a weight that tapers (linearly, for example) from 100% to 0% with increasing distance from the center of the virtual skinning tool 306 in the falloff range 330. More generally, application of the virtual skinning tool 306 may assign different weights to different vertices that are different distances from the center (or reference point) of the virtual skinning tool 306. However, the function shown in FIG. 19 is an example only, and alternative embodiments may differ. Skinning weights as described above are another example of parameters of articulated movement (or, more generally, animation parameters) that may be defined in response to user interaction with a virtual user interface as described herein.

Figure 20:
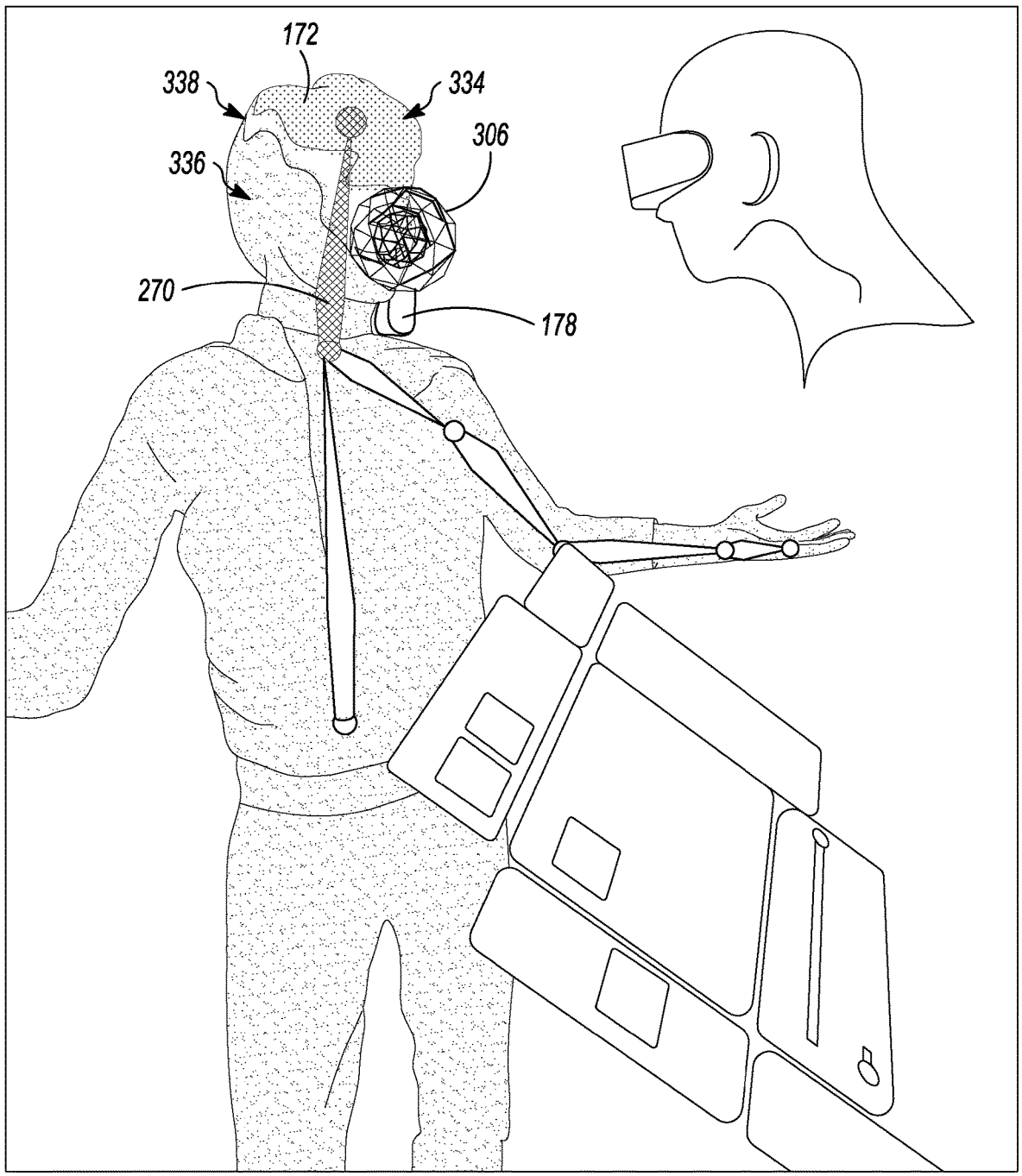
FIG. 20 to FIG. 31 illustrate other examples of the virtual user interface of FIG. 4.

As indicated above, the program codes at block 324 may include program codes that cause the processor circuit 136 to display the skinning in the illustration 172. For example, FIG. 20 illustrates an example in which the rig element 270 is selected, in which vertices shown generally at 334 are shown in the illustration 172 with a first colour indicating association with the selected rig element with a weight of 100%, in which vertices shown generally at 336 are shown in the illustration 172 with a second colour different from the first colour and indicating no association with the selected rig element (or association with the selected rig element with a weight of 0%), and in which vertices shown generally at 338 are shown with one or more colours different from the first and second colours and each indicating association with the selected rig element with a respective different weight more than 0% but less than 100%.

After block 324, the skinning program codes 278 may then return to block 312. Therefore, the user may return to blocks 316 and 324 to select other ones of the rig elements in the illustration 172 and to define skinning parameters associating other vertices with the other ones of the rig elements. In some embodiments, a vertex may be associated with up to four rig elements or any other number or range of rig elements as described above, for example.

While skinning, the user may wish to vary a pose of the rig, for example to preview movement of one or more vertices in response to movement of one or more rig elements. For example, the user may vary a pose of the rig by selecting one of the rig elements (for example when the virtual pointing device 214 or the virtual skinning tool 306 is near the selected rig element) and by indicating a pose change by moving the movement sensor 122, by actuation of one or more of the user inputs 130, 132, and 134 of the movement sensor 122, or by both.

Figure 21:
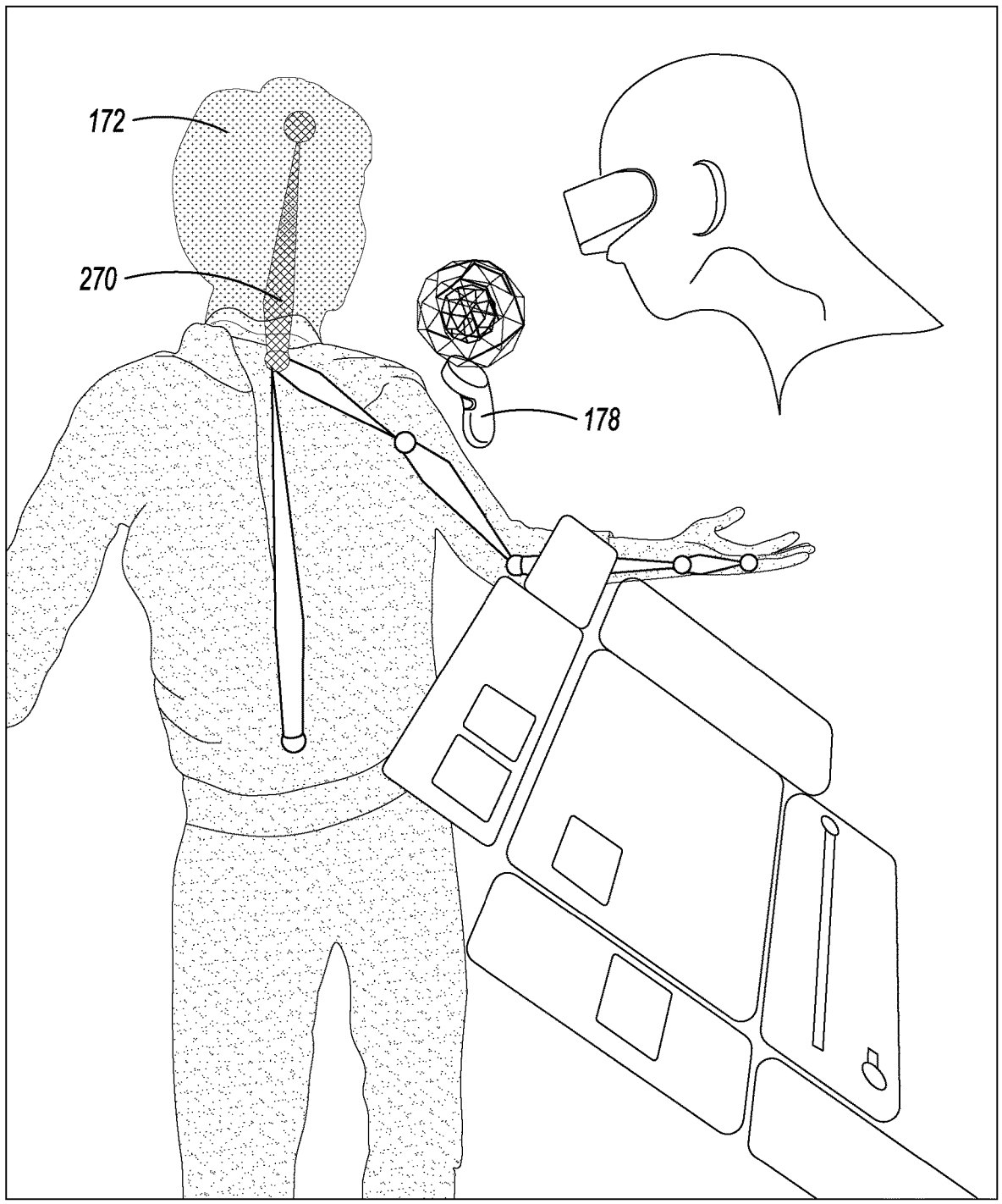

Therefore, if at block 320 a rig element has not been selected, or if at block 322 the one or more user input signals received at block 312 do not indicate skinning, then the skinning program codes 278 may continue at block 340, which may include program codes that, when executed by the microprocessor 138, cause the processor circuit 136 to determine whether the one or more user input signals received at block 312 indicate varying the pose. If at block 340 the one or more user input signals received at block 312 do indicate varying the pose, then the skinning program codes 278 may continue at block 342, which may include program codes that, when executed by the microprocessor 138, cause the processor circuit 136 to adjust the pose and to display the adjusted pose. At block 342, movement of rig elements may be according to forward kinematics. When a pose is varied, positions of vertices in the illustration 172 may vary according to skinning parameters of the vertices. For example, FIG. 21 illustrates an example in which user input at block 312 has, at block 342, adjusted a direction of the rig element 270 relative to other rig elements of the three-dimensional shape shown in the illustration 172.

After block 342, or if at block 340 the one or more user input signals received at block 312 do not indicate a pose change, then the skinning program codes 278 may return to block 312. However, the skinning program codes 278 are an example only, and alternative embodiments may differ. For example, alternative embodiments may include more, fewer, or different blocks of code, and may include blocks of code in a different order. Further, embodiments such as those described herein may have additional functionality, for example when one or more other skinning tool icons are selected. For example, "automatic" skinning may involve automatically moving a tool (such as the virtual skinning tool 306, for example) as described above. Further, in some embodiments, skinning may be previously or automatically defined, and some embodiments may involve only adjustment of previously or automatically defined skinning parameters.

The examples described above involve skinning once a rig has been defined. However, alternative embodiments may differ. For example, some embodiments may involve skinning as described above but not necessarily with a previously defined rig. In such embodiments, program codes in the program memory 140 may, when executed by the microprocessor 138, cause the processor circuit 136 to infer, from user input indicating skinning as described above for example, locations of control points, shapes or dimensions of rig elements, other rigging parameters, or a combination of two or more thereof (such that the rig thus inferred defines possible movement according to the user input) and to store storage codes representing such rigging parameters in the rigging store 240.

Following rigging and skinning of at least one three-dimensional shape, as described above for example, the user may animate the at least one three-dimensional shape. Therefore, referring back to FIG. 3, the program memory 140 may also include animation program codes 344 including blocks of program codes that, when executed by the microprocessor 138, cause the processor circuit 136 to receive input signals from one or both of the movement sensors 120 and 122 defining at least one animation parameter of at least one rig element of the three-dimensional shape shown in the illustration 172.

Figure 22:
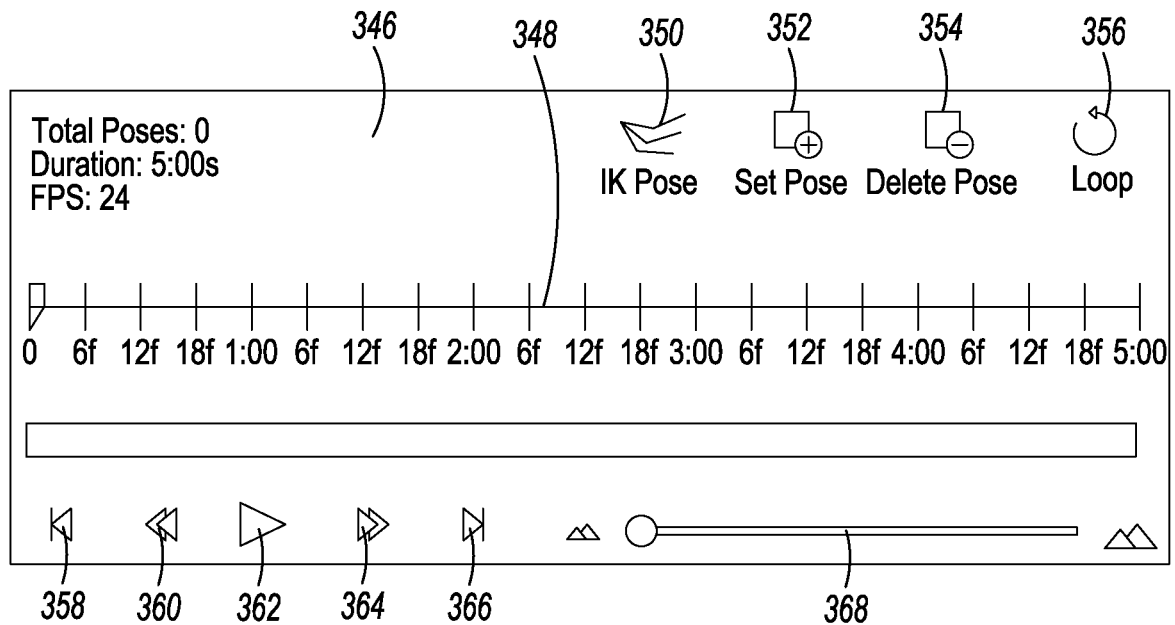

The animation program codes 344 may begin in response to user selection of an animation mode, for example by actuating one or more of the user inputs 130, 132, and 134 of the movement sensor 122 when the virtual pointing device 214 and the icon pointer 216 point to the animation icon 196. The animation program codes 344 may also include program codes that, when executed by the microprocessor 138, cause the processor circuit 136 to include, in the virtual user interface, an illustration of a virtual animation menu 346. As shown in FIG. 22, the virtual animation menu 346 may include a keyframe timeline 348, an inverse kinematics ("IK") pose icon 350, a set pose icon 352, a delete pose icon 354, a loop icon 356, a to-beginning icon 358, a rewind icon 360, a playback or pause icon 362, a fast-forward icon 364, a to-end icon 366, and a zoom selection icon 368.

Figure 23:
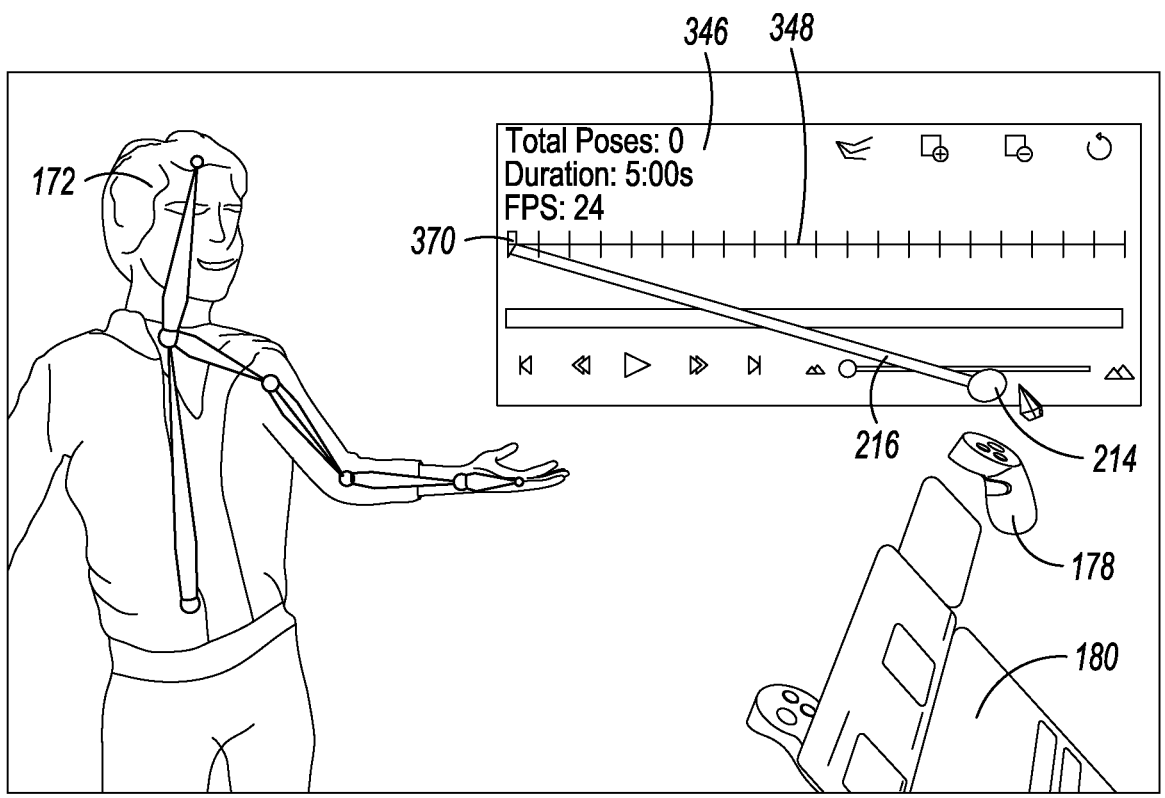
Figure 24:
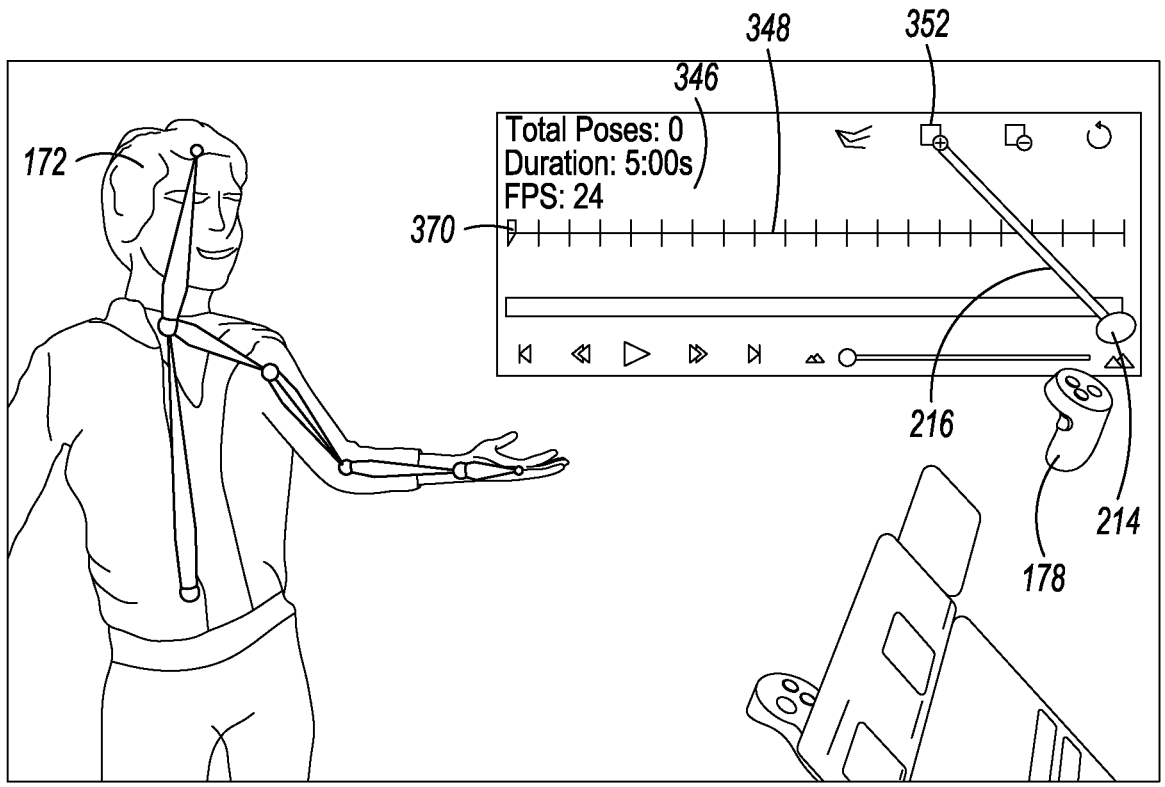

As shown in the example of FIG. 23, the user may select a keyframe from the keyframe timeline 348, for example by pointing the virtual pointing device 214 and the icon pointer 216 to a location of the keyframe timeline 348 representing the selected keyframe and by actuation of one or more of the user inputs 130, 132, and 134 of the movement sensor 122. A selected keyframe icon 370 in the keyframe timeline 348 may indicate the selected keyframe. Following any adjustments to the pose of the rig elements, the user may select the set pose icon 352, as shown in the example of FIG. 24, and in response, the animation program codes 344 may cause the processor circuit 136 to store, in a keyframes store 372 in the storage memory 142, one or more storage codes representing the defined pose at the selected keyframe.

Figure 25:
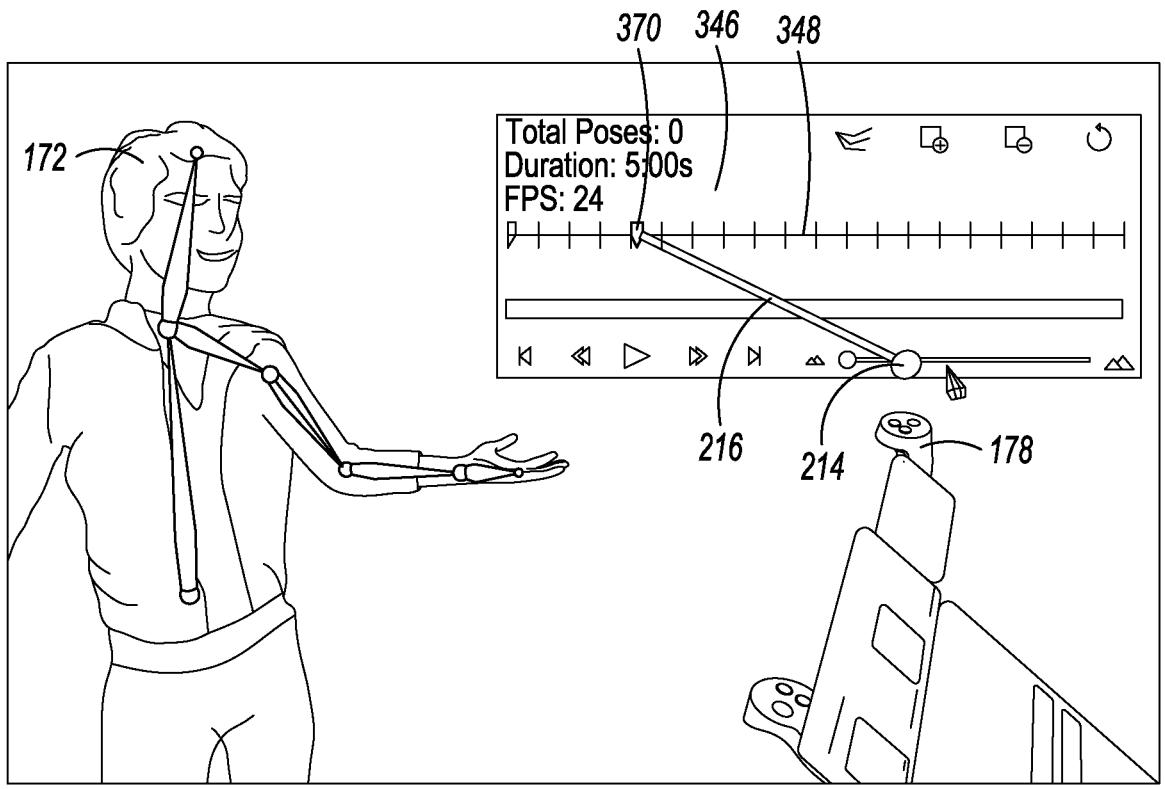
Figure 26:
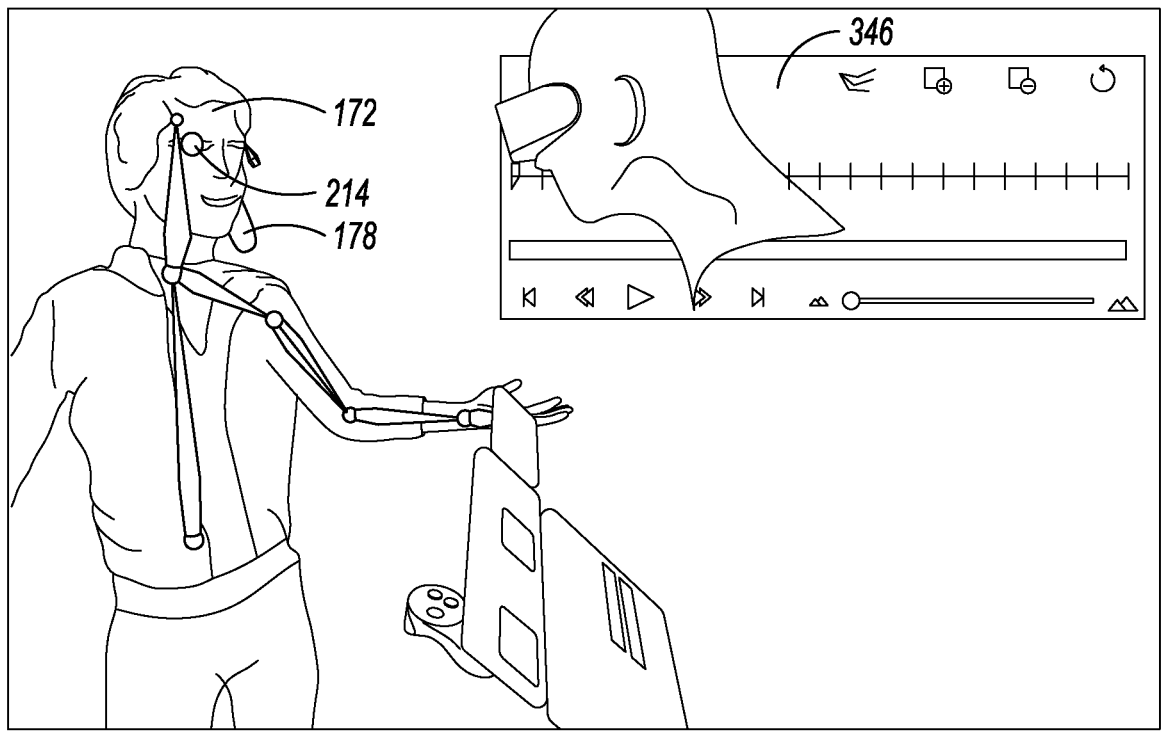
Figure 27:
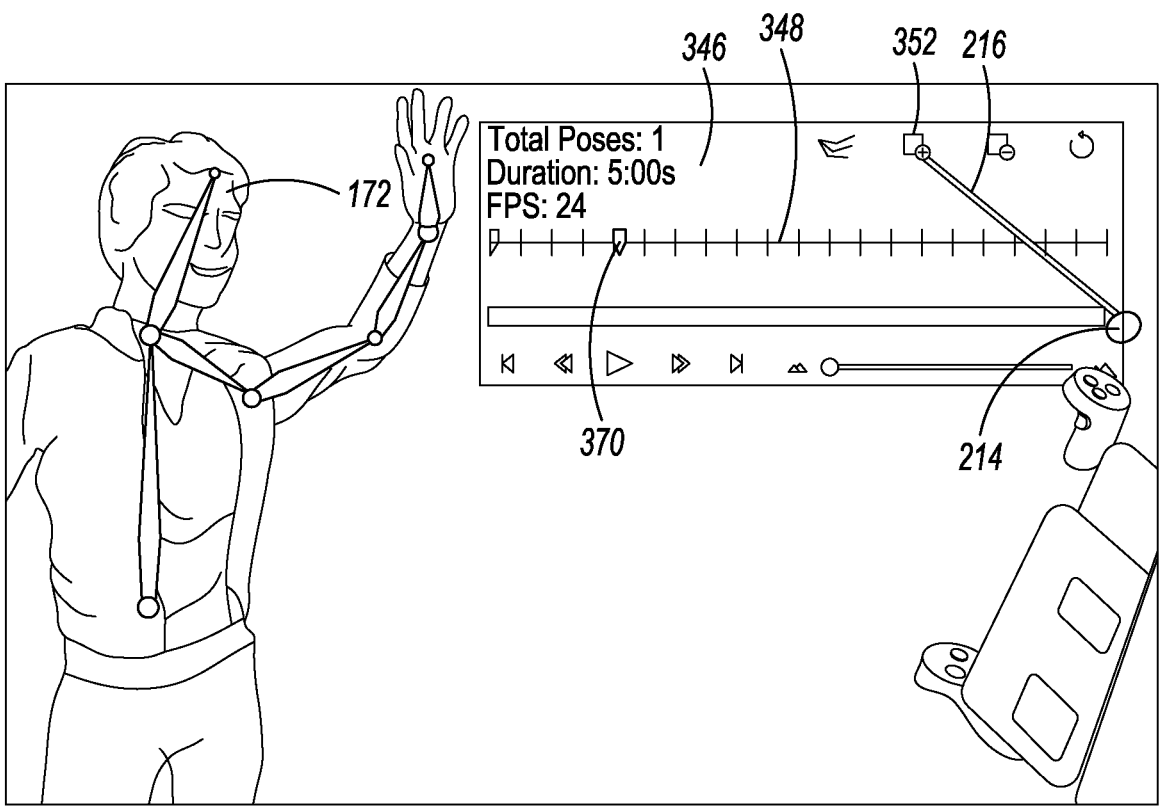
Figure 28:
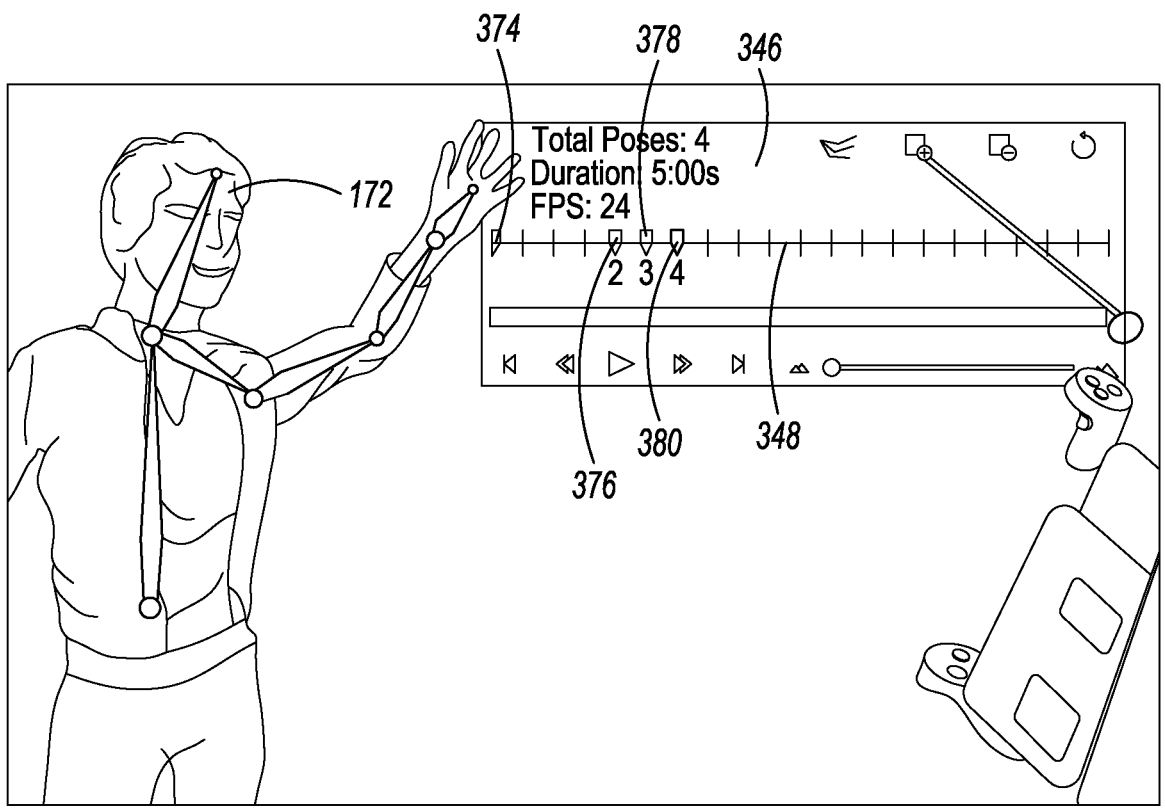

The user may define different poses for different keyframes, and when a pose is varied, positions of vertices in the illustration 172 may vary according to skinning parameters of the vertices. For example, in the example of FIG. 25 to FIG. 27, the user has selected a different keyframe, which caused the selected keyframe icon 370 to move to indicate the selected keyframe, and the user has defined a different pose for the selected keyframe as shown in FIG. 26 and in FIG. 27. Then, in response to user selection of the set pose icon 352 again, as shown in the example of FIG. 27, and in response, the animation program codes 344 may cause the processor circuit 136 to store, in the keyframes store 372, one or more storage codes representing the pose at the selected keyframe. In the example of FIG. 28, the user has defined respective poses at four keyframes, and keyframe icons 374, 376, 378, and 380 in the keyframe timeline 348 indicate that respective poses have been defined at the indicated keyframes. The different poses for different keyframes as described above are another example of parameters of articulated movement (or, more generally, animation parameters) that may be defined in response to user interaction with a virtual user interface as described herein.

In response to user selection of the playback or pause icon 362, the illustration 172 may animate by linear interpolation of poses defined for different keyframes. Because movement of at least one rig element relative to another rig element may define articulated movement, such linear interpolation of poses may be another example of articulated movement. Such an animation may be displayed to the user in the virtual user interface, or such an animation may be rendered into storage codes of an animated image format (such as a Filmbox™ or "FBX" animated image format, for example) and stored in an animation store 382 in the storage memory 142. Such codes of an animated image format may also be exported or transmitted to one or more other computers (for example in one or more output signals from the computer network 164 using the network interface 162). When animations may be exported, the rig may be validated as a humanoid rig, which may facilitate use of animations created for similar rigs.

The embodiments described above include rig elements (such as the rig elements 244, 254, 258, 260, 262, and 270) in a rig. However, in some other embodiments, rig elements may differ and many not necessarily be rig elements of a rig. Movement of such rig elements may not necessarily be articulated movement. For example, animation in some embodiments may involve per-vertex animation, which may involve using rig elements that may not necessarily be rig elements of a rig, and that may include two or more control points. Per-vertex animation may also be referred to as "morph target animation", "shape interpolation", "shape keys", or "blend shapes".

Therefore, the animation program codes 344 may also include program codes that, when executed by the microprocessor 138, cause the processor circuit 136 to display a per-vertex animation virtual user interface to the user when the user wears the headset 110, for example in response to user selection of a per-vertex animation mode by actuating one or more of the user inputs 130, 132, and 134 of the movement sensor 122. The animation program codes 344 may also include program codes that, when executed by the microprocessor 138, cause the processor circuit 136 to receive input signals from one or both of the movement sensors 120 and 122 defining at least one per-vertex animation parameter (or, more generally, an animation parameter) of at least one rig element of a three-dimensional shape, such as the three-dimensional shape shown in the illustration 384 in FIG. 29 to FIG. 31.

Figure 29:
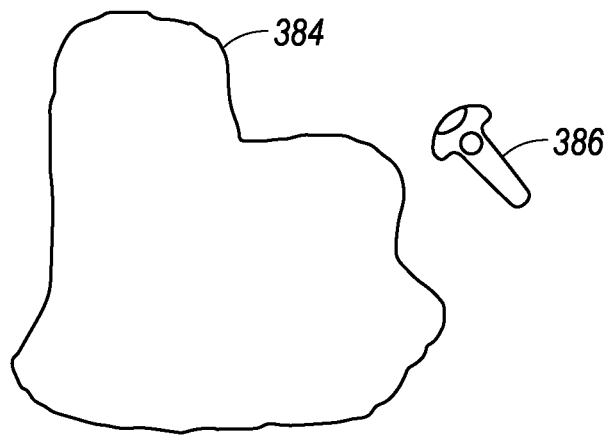
Figure 30:
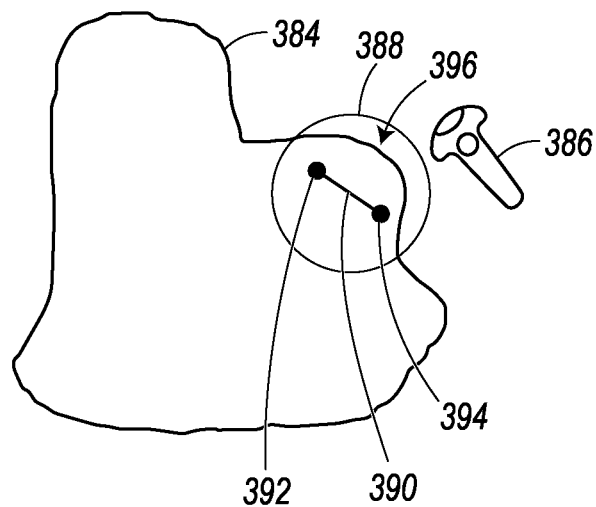
Figure 31:
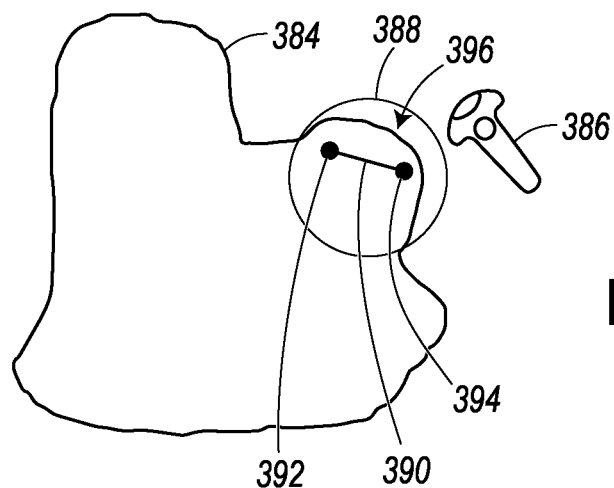

Referring to FIG. 29 to FIG. 31, an example of such a per-vertex animation virtual user interface is illustrated and includes the illustration 384 and an illustration 386 of the movement sensor 122, although alternative embodiments may differ. As shown in FIG. 30, when the illustration 386 is near a portion of the illustration 384, user input (for example, by actuation of one or more of the user inputs 130, 132, and 134 of the movement sensor 122) may cause the per-vertex animation virtual user interface to include a virtual per-vertex animation tool 388, which may be similar to the virtual skinning tool 306 described above. In the embodiment shown, the virtual per-vertex animation tool 388 has a spherical shape, although alternative embodiments may differ. In general, a shape of a virtual per-vertex animation tool may be defined according to an algorithm, according to a neural network, or according to both, for example. At least a portion of the three-dimensional shape of the illustration 384 may be within at least a portion of the virtual per-vertex animation tool 388.

As also shown in FIG. 30, when at least a portion of the three-dimensional shape of the illustration 384 is within at least a portion of the virtual per-vertex animation tool 388, program codes in the animation program codes 344 may also, when executed by the microprocessor 138, cause the processor circuit 136 to define automatically an initial location, an initial length (or other initial dimension), or both of a per-vertex rig element 390. In the embodiment shown, the per-vertex rig element 390 is within the three-dimensional shape of the illustration 384 and within the virtual per-vertex animation tool 388, but alternative embodiments may differ. For example, in alternative embodiments, the per-vertex rig element 390 may be positioned outside the three-dimensional shape of the illustration 384. Therefore, the initial location, the initial length (or other initial dimension), or both of the per-vertex rig element 390 are examples of per-vertex animation parameters (or, more generally, of animation parameters) that may be defined in response to user interaction with the per-vertex animation virtual user interface.

In the embodiment shown, the per-vertex rig element 390 is a straight line between control points 392 and 394. The initial locations of the control points 392 and 394, and therefore the initial location and initial length of the straight line, may be determined automatically in a manner that allows the per-vertex rig element 390 to be associated with surface elements (shown generally at 396 in the example of FIG. 30) of the three-dimensional shape of the illustration 384 that are within the virtual per-vertex animation tool 388. In general, locations of one or more control points of a per-vertex rig element may be defined according to an algorithm, according to a neural network, or according to both, for example, and may, for example, be defined according to an intersection of the virtual per-vertex animation tool 388 and the three-dimensional shape of the illustration 384. However, alternative embodiments may differ. For example, in alternative embodiments, a per-vertex rig element may be a piecewise linear shape including a sequence of straight lines extending from the control point, or may have other two-dimensional or three-dimensional shapes.

Also, in the embodiment shown, when at least a portion of the three-dimensional shape of the illustration 384 is within at least a portion of the virtual per-vertex animation tool 388, program codes in the animation program codes 344 may also, when executed by the microprocessor 138, cause the processor circuit 136 to define respective weights defining respective degrees of influence of movement of the per-vertex rig element 390 to movement of the surface elements (shown generally at 396 in the example of FIG. 30) of the three-dimensional shape of the illustration 384 that are within the virtual per-vertex animation tool 388. In the embodiment shown, the respective weights of the surface elements may be defined according to the position and size of the virtual per-vertex animation tool 388 and as the virtual skinning tool 306 is described above. In other words, in the embodiment shown, the virtual per-vertex animation tool 388 may also function as a virtual skinning tool as described above such that respective weights of each surface element of the surface elements 396 may be defined according to a function of a distance from a center (or reference point) of the virtual per-vertex animation tool 388 to the surface element. However, alternative embodiments may differ.

After the initial location of the per-vertex rig element 390 is defined as described above, the user may move the movement sensor 122, which may cause corresponding movement of the virtual per-vertex animation tool 388 and of the per-vertex rig element 390. Such movement of the per-vertex rig element 390 may include linear movement relative to three different axes, rotational movement relative to three different axes, or both, for example. An algorithm, a neural network, or both, for example, may define how one or more control points of one or more per-vertex rig elements may move according to per-vertex animation as described herein, for example. Such movement of the per-vertex rig element 390 is another example of a per-vertex animation parameter (or, more generally, an animation parameter) that may be defined in response to user interaction with the per-vertex animation virtual user interface.

FIG. 31 illustrates an example of movement of the per-vertex rig element 390 and of the surface elements 396 in response to movement of the movement sensor 122. In general, movements of one or more surface elements of a three-dimensional shape according to movement of a per-vertex animation tool may be defined according to an algorithm, according to a neural network, or according to both, for example. The virtual per-vertex animation tool 388 may therefore define a sphere of influence, although virtual per-vertex animation tools in alternative embodiments may have other shapes.

Using a virtual animation menu such as the virtual animation menu 346, a user may define a per-vertex rig element (such as the per-vertex rig element 390) beginning at one keyframe, and may define movement of the per-vertex rig element during one or more transitions to one or more subsequent keyframes. Therefore, such per-vertex rig elements may be associated with transitions between two or more keyframes, and keyframe animation may involve moving surface elements (such as the surface elements 396) according to their respective weights and according to such movements of such per-vertex rig elements. Therefore, such movement of the surface elements 396 is an example of per-vertex animation. Further, because such per-vertex rig elements may be associated only with transitions between two or more keyframes, such per-vertex rig elements may be temporary and may be removed after the two or more keyframes.

Figure 32:
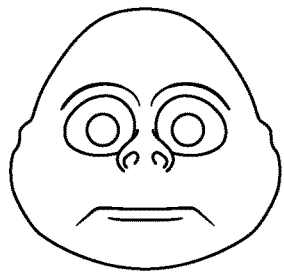
FIG. 32 to FIG. 43 illustrate examples of per-vertex animation.
Figure 33:
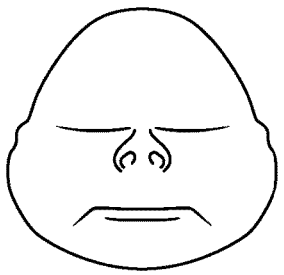
Figure 34:
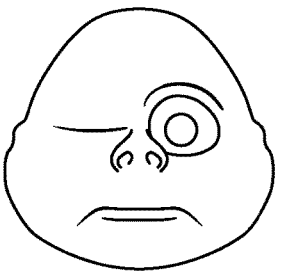
Figure 35:
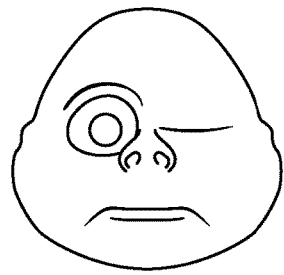
Figure 36:
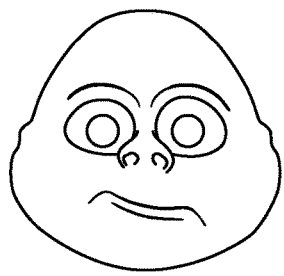
Figure 37:
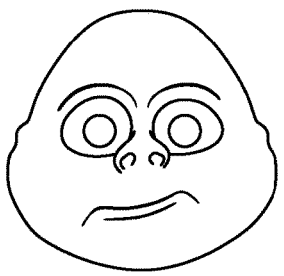
Figure 38:
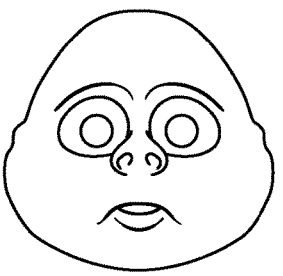
Figure 39:
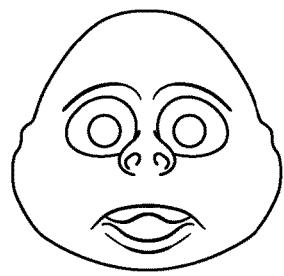
Figure 40:
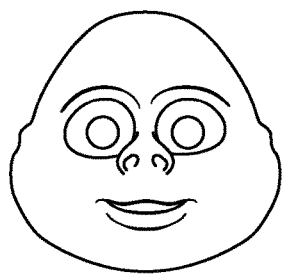
Figure 41:
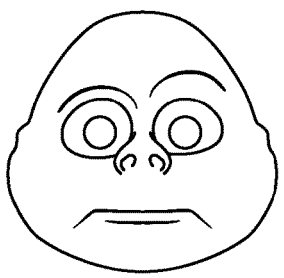
Figure 42:
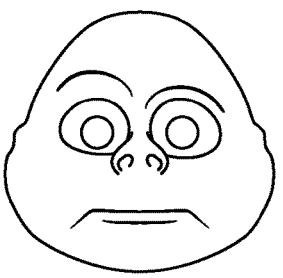
Figure 43:
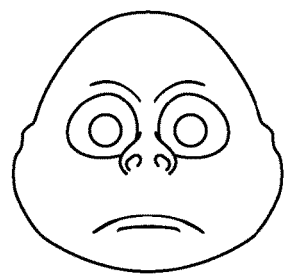

In some embodiments, per-vertex animation (as described above, for example) may, for example, facilitate animation of an initial three-dimensional shape of a face (shown in FIG. 32) to animate movements such as blinking (shown in FIG. 33), right-side winking (shown in FIG. 34), left-side winking (shown in FIG. 35), right-side smirking (shown in FIG. 36), left-side smirking (shown in FIG. 37), narrow mouth-opening (shown in FIG. 38), wide mouth-opening (shown in FIG. 39), smiling (shown in FIG. 40), left-brow raising (shown in FIG. 41), right-brow raising (shown in FIG. 42), and frowning (shown in FIG. 43).

The example of FIG. 29 to FIG. 31 involves the per-vertex rig element 390. However, alternative embodiments of per-vertex animation may not necessarily involve any rig elements. For example, in some embodiments, a virtual per-vertex animation tool may define a sphere of influence (or another shape) that may directly be used to select and move one or more surface elements of a three-dimensional shape, such as one or more surface elements within the sphere of influence or other shape of the virtual per-vertex animation tool, without necessarily involve any rig elements.

In general, embodiments such as those described herein may include a three-dimensional user interface for defining one or more animation parameters, such as one or more parameters of articulated movement of at least one three-dimensional shape or one or more per-vertex parameters of at least one three-dimensional shape. As indicated above, such parameters of articulated movement may include one or more rigging parameters defining one or more of a plurality of rig elements of the at least one three-dimensional shape, and such parameters of articulated movement may additionally or alternatively include one or more skinning parameters defining one or more associations of at least one surface element (such as at least one vertex of a mesh) of the at least one three-dimensional shape with at least one of the plurality of rig elements. In general, such animation parameters may characterize, constrain, or configure movement such as articulated movement or per-vertex animation, or may define one or more characteristics or manners of movement such as articulated movement or per-vertex animation.

Such a three-dimensional user interface may be more intuitive, more natural, faster, easier to learn, or more efficient than other methods of skinning, rigging, per-vertex animation, or defining one or more animation parameters of at least one three-dimensional shape. Embodiments such as those described herein may allow rigging, skinning, or animating, or two or all three thereof, in one virtual three-dimensional user interface or in more than one virtual three-dimensional user interfaces. Applications of embodiments such as those described herein may include movie or television production, video game production, training, education, industrial design, prototyping, or other applications.

Although specific embodiments have been described and illustrated, such embodiments should be considered illustrative only and not as limiting the invention as construed according to the accompanying claims.

The invention claimed is:

1. A computer animation method comprising:
causing at least one visual display to display at least one virtual three-dimensional user interface to at least one user; and
receiving at least one user input signal from at least one sensor of three-dimensional movement in response to, at least, movement of the at least one sensor by the at least one user, wherein the at least one user input signal represents interaction by the at least one user with the at least one virtual three-dimensional user interface at least to define at least one animation parameter, wherein the at least one animation parameter comprises at least one parameter of articulated movement.

2. The method of claim 1 wherein the at least one visual display comprises at least one stereoscopic visual display.

3. The method of claim 2 wherein a headset comprises the at least one stereoscopic visual display.

4. The method of claim 1 wherein the at least one animation parameter comprises at least one animation parameter defining at least one rig element.

5. The method of claim 4 wherein each rig element of the at least one rig element comprises a respective at least one control point and a respective rigid shape.

6. The method of claim 5 wherein, for each rig element of the at least one rig element, the respective rigid shape is movable relative to one of the respective at least one control point.

7. The method of claim 5 wherein the at least one animation parameter defining the at least one rig element comprises at least one animation parameter defining the respective rigid shape of the at least one rig element.

8. The method of claim 5 wherein the at least one animation parameter defining the at least one rig element comprises at least one animation parameter defining a dimension of the respective rigid shape of the at least one rig element.

9. The method of claim 5 wherein the at least one animation parameter defining the at least one rig element comprises at least one animation parameter defining a location, relative to at least one other rig element, of one of the respective at least one control point of the at least one rig element.

10. The method of claim 5 wherein the at least one animation parameter defining the at least one rig element comprises at least one animation parameter defining a location, relative to at least one three-dimensional shape, of one of the respective at least one control point of the at least one rig element.

11. The method of claim 10 further comprising defining the location of the respective at least one control point of the at least one rig element automatically in response to, at least, a location, relative to the at least one three-dimensional shape, of at least one virtual per-vertex animation tool movable in the at least one virtual three-dimensional user interface in response to, at least, movement of the at least one sensor by the at least one user.

12. The method of claim 11 further comprising defining a dimension of the at least one rig element automatically in response to, at least, an intersection of the at least one virtual per-vertex animation tool and the at least one three-dimensional shape.

13. The method of claim 10 wherein the at least one animation parameter comprises at least one animation parameter defining at least one association of at least one surface element of the at least one three-dimensional shape with one or more of the at least one rig element.

14. The method of claim 10 wherein the at least one animation parameter comprises at least one animation parameter defining movement of at least one surface element of the at least one three-dimensional shape relative to at least one other surface element of the at least one three-dimensional shape.

15. The method of claim 1 wherein the at least one animation parameter comprises at least one animation parameter defining movement of at least one surface element of at least one three-dimensional shape relative to at least one other surface element of the at least one three-dimensional shape.

16. The method of claim 1 wherein the at least one animation parameter comprises at least one animation parameter defining at least one association of at least one surface element of at least one three-dimensional shape with at least one rig element.

17. The method of claim 16 wherein each rig element of the at least one rig element comprises a respective at least one control point and a respective rigid shape.

18. The method of claim 17 wherein, for each rig element of the at least one rig element, the respective rigid shape is movable relative to one of the respective at least one control point.

19. The method of claim 13 wherein the at least one association of the at least one surface element of the at least one three-dimensional shape with the at least one rig element comprises a respective weight associated with each rig element of the at least one rig element and defining a respective degree of influence of movement of the at least one rig element to movement of the at least one surface element of the at least one three-dimensional shape.

20. The method of claim 10 wherein the at least one virtual three-dimensional user interface comprises an illustration of at least a portion of the at least one three-dimensional shape.

21. The method of claim 13 wherein the at least one virtual three-dimensional user interface comprises an illustration of at least a portion of the at least one three-dimensional shape, and the at least one user input defining the at least one association of the at least one surface element of the at least one three-dimensional shape with the at least one rig element comprises application, to the illustration, of at least one virtual skinning tool movable in the at least one virtual three-dimensional user interface in response to, at least, movement of the at least one sensor by the at least one user.

22. The method of claim 21 wherein the application of the at least one virtual skinning tool to the illustration comprises:
defining the at least one association of a first surface element of the at least one three-dimensional shape with the at least one rig element; and
defining the at least one association of a second surface element of the at least one three-dimensional shape with the at least one rig element.

23. The method of claim 22 wherein the at least one association of the first surface element differs from the at least one association of the second surface element.

24. The method of claim 22 wherein the first surface element and the second surface element are at different distances from a reference point of the at least one virtual skinning tool.

25. The method of claim 13 wherein the at least one virtual three-dimensional user interface comprises an illustration of the at least one association of the at least one surface element of the at least one three-dimensional shape with the at least one rig element.

26. The method of claim 10 further comprising producing at least one output signal representing animation of the at least one three-dimensional shape according to the at least one animation parameter.

27. The method of claim 4 further comprising defining a respective position of the at least one rig element for at least one keyframe of animation.

28. The method of claim 4 wherein the at least one virtual three-dimensional user interface comprises an illustration of the at least one rig element.

29. The method of claim 4 wherein the at least one rig element is at least one rig element of a rig comprising a plurality of rig elements.

30. At least one computer-readable medium comprising program codes stored thereon that, when executed by at least one processor, cause the at least one processor to implement the method of claim 1.

31. A computer animation system comprising:
the at least one computer-readable medium of claim 30; and
the at least one processor.

32. The system of claim 31 further comprising the at least one visual display.

33. The system of claim 31 further comprising the at least one sensor.

34. A computer animation system comprising:
at least one processor programmed to, at least:
cause at least one visual display to display at least one virtual three-dimensional user interface to at least one user;
receive at least one user input signal from at least one sensor of three-dimensional movement in response to, at least, movement of the at least one sensor by the at least one user, wherein the at least one user input signal represents interaction by the at least one user with the at least one virtual three-dimensional user interface; and
define at least one animation parameter in response to, at least, the interaction by the at least one user with the at least one virtual three-dimensional user interface, wherein the at least one animation parameter comprises at least one parameter of articulated movement.

35. The system of claim 34 wherein the at least one animation parameter comprises at least one animation parameter defining at least one rig element.

36. The system of claim 35 wherein each rig element of the at least one rig element comprises a respective at least one control point and a respective rigid shape.

37. The system of claim 36 wherein, for each rig element of the at least one rig element, the respective rigid shape is movable relative to one of the respective at least one control point.

38. The system of claim 36 wherein the at least one animation parameter defining the at least one rig element comprises at least one animation parameter defining the respective rigid shape of the at least one rig element.

39. The system of claim 36 wherein the at least one animation parameter defining the at least one rig element comprises at least one animation parameter defining a dimension of the respective rigid shape of the at least one rig element.

40. The system of claim 36 wherein the at least one animation parameter defining the at least one rig element comprises at least one animation parameter defining a location, relative to at least one other rig element, of one of the respective at least one control point of the at least one rig element.

41. The system of claim 36 wherein the at least one animation parameter defining the at least one rig element comprises at least one animation parameter defining a location, relative to at least one three-dimensional shape, of one of the respective at least one control point of the at least one rig element.

42. The system of claim 41 wherein the at least one processor is further programmed to, at least, define the location of the respective at least one control point of the at least one rig element automatically in response to, at least, a position, relative to the at least one three-dimensional shape, of at least one virtual per-vertex animation tool movable in the at least one virtual three-dimensional user interface in response to, at least, movement of the at least one sensor by the at least one user.

43. The system of claim 42 wherein the at least one processor is further programmed to, at least, define a dimension of the at least one rig element automatically in response to, at least, an intersection of the at least one virtual per-vertex animation tool and the at least one three-dimensional shape.

44. The system of claim 41 wherein the at least one animation parameter comprises at least one animation parameter defining at least one association of at least one surface element of the at least one three-dimensional shape with one or more of the at least one rig element.

45. The system of claim 41 wherein the at least one animation parameter comprises at least one animation parameter defining movement of at least one surface element of the at least one three-dimensional shape relative to at least one other surface element of the at least one three-dimensional shape.

46. The system of claim 34 wherein the at least one animation parameter comprises at least one animation parameter defining movement of at least one surface element of at least one three-dimensional shape relative to at least one other surface element of the at least one three-dimensional shape.

47. The system of claim 34 wherein the at least one animation parameter comprises at least one animation parameter defining at least one association of at least one surface element of at least one three-dimensional shape with at least one rig element.

48. The system of claim 47 wherein each rig element of the at least one rig element comprises a respective at least one control point and a respective rigid shape.

49. The system of claim 48 wherein, for each rig element of the at least one rig element, the respective rigid shape is movable relative to one of the respective at least one control point.

50. The system of claim 44 wherein the at least one association of the at least one surface element of the at least one three-dimensional shape with the at least one rig element comprises a respective weight associated with each rig element of the at least one rig element and defining a respective degree of influence of movement of the at least one rig element to movement of the at least one surface element of the at least one three-dimensional shape.

51. The system of claim 41 wherein the at least one virtual three-dimensional user interface comprises an illustration of at least a portion of the at least one three-dimensional shape.

52. The system of claim 44 wherein the at least one virtual three-dimensional user interface comprises an illustration of at least a portion of the at least one three-dimensional shape, and the at least one user input defining the at least one association of the at least one surface element of the at least one three-dimensional shape with the at least one rig element comprises application, to the illustration, of at least one virtual skinning tool movable in the at least one virtual three-dimensional user interface in response to, at least, movement of the at least one sensor by the at least one user.

53. The system of claim 52 wherein the at least one processor is further programmed to, at least, in response to, at least, the application of the at least one virtual skinning tool to the illustration:
define the at least one association of a first surface element of the at least one three-dimensional shape with the at least one rig element; and
define the at least one association of a second surface element of the at least one three-dimensional shape with the at least one rig element.

54. The system of claim 53 wherein the at least one association of the first surface element differs from the at least one association of the second surface element.

55. The system of claim 53 wherein the first surface element and the second surface element are at different distances from a reference point of the at least one virtual skinning tool.

56. The system of claim 44 wherein the at least one virtual three-dimensional user interface comprises an illustration of the at least one association of the at least one surface element of the at least one three-dimensional shape with the at least one rig element.

57. The system of claim 41 wherein the at least one processor is further programmed to, at least, produce at least one output signal representing animation of the at least one three-dimensional shape according to the at least one animation parameter.

58. The system of claim 35 wherein the at least one processor is further programmed to, at least, in response to, at least, the interaction by the at least one user with the at least one virtual three-dimensional user interface, define a respective position of the at least one rig element for at least one keyframe of animation.

59. The system of claim 35 wherein the at least one virtual three-dimensional user interface comprises an illustration of the at least one rig element.

60. The system of claim 35 wherein the at least one rig element is at least one rig element of a rig comprising a plurality of rig elements.

61. The system of claim 34 further comprising the at least one visual display.

62. The system of claim 61 wherein the at least one visual display comprises at least one stereoscopic visual display.

63. The system of claim 62 wherein a headset comprises the at least one stereoscopic visual display.

64. The system of claim 34 further comprising the at least one sensor.

* * * * *